(12) United States Patent
Watanabe

(10) Patent No.: US 7,288,303 B2
(45) Date of Patent: *Oct. 30, 2007

(54) STRUCTURES OF BRITTLE MATERIALS AND METALS

(75) Inventor: Keiichiro Watanabe, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/144,370

(22) Filed: Jun. 3, 2005

(65) Prior Publication Data

US 2006/0019044 A1    Jan. 26, 2006

Related U.S. Application Data

(60) Provisional application No. 60/604,208, filed on Aug. 25, 2004.

(30) Foreign Application Priority Data

Jun. 8, 2004    (JP)    ............................ P2004-169497

(51) Int. Cl.
B32B 1/08    (2006.01)
B32B 1/04    (2006.01)
B32B 7/04    (2006.01)
B32B 7/08    (2006.01)
B32B 15/04    (2006.01)
F16L 13/007    (2006.01)
F16L 13/14    (2006.01)

(52) U.S. Cl. .................. 428/34.4; 428/34.1; 428/34.6; 428/201; 428/689; 138/143; 138/147; 285/238; 285/242; 285/256

(58) Field of Classification Search .................. None
See application file for complete search history.

(56) References Cited

U.S. PATENT DOCUMENTS

| 3,531,853 A | 10/1970 | Klomp |
| 3,564,328 A | 2/1971 | Bagley et al. |
| 3,848,151 A | 11/1974 | McVey |
| 4,011,480 A | 3/1977 | Jacobs et al. |
| 4,376,905 A | 3/1983 | Kerekes |
| 4,459,509 A | 7/1984 | Csapody et al. |
| 4,746,582 A | 5/1988 | Tsuno |
| 4,803,403 A | 2/1989 | Makar, Jr. et al. |

(Continued)

FOREIGN PATENT DOCUMENTS

GB    1 435 244    5/1976

(Continued)

OTHER PUBLICATIONS

U.S. Appl. No. 11/391,945, filed Mar. 29, 2006, Watanabe et al.

*Primary Examiner*—Jennifer McNeil
*Assistant Examiner*—Jason L. Savage
(74) *Attorney, Agent, or Firm*—Burr & Brown

(57) ABSTRACT

A structure 26 of brittle material and metal has brittle materials 24, 25 and a plate-shaped metal piece 21. The plate-shaped metal piece 21 has a clamped portion 22 pressed and clamped with the brittle material and a non-clamped portion 23 not clamped with the brittle material. The deformation of the plate-shaped metal piece relaxes stress generated along an interface where the clamped portion 23 and brittle materials 24, 25 contact each other.

35 Claims, 17 Drawing Sheets

U.S. PATENT DOCUMENTS

| | | |
|---|---|---|
| 5,404,077 A | 4/1995 | Eichelbrönner et al. |
| 6,027,389 A | 2/2000 | Miyazawa et al. |
| 6,262,533 B1 | 7/2001 | Niimi |
| 2004/0086298 A1 | 5/2004 | Ojima et al. |

FOREIGN PATENT DOCUMENTS

| | | |
|---|---|---|
| JP | 41-7815 | 4/1966 |
| JP | 45-10627 | 5/1970 |
| JP | 50-45482 | 4/1975 |
| JP | 50-78175 | 6/1975 |
| JP | 51-72187 | 6/1976 |
| JP | 52-080675 | 7/1977 |
| JP | 56-128561 | 10/1981 |
| JP | 57-046562 | 3/1982 |
| JP | 57-145261 | 9/1982 |
| JP | 60-59352 | 4/1985 |
| JP | 62-182174 | 8/1987 |
| JP | 63-159264 | 7/1988 |
| JP | 63-259958 | 10/1988 |
| JP | 05 205701 | 8/1993 |
| JP | 06-296107 | 10/1994 |
| JP | 07-33294 | 4/1995 |
| JP | 10-125230 | 5/1998 |
| JP | 11-149902 | 6/1999 |
| JP | 11-265686 | 9/1999 |
| JP | 2004-134219 | 4/2004 |
| JP | 2004-149640 | 5/2004 |
| JP | 2004-163911 | 6/2004 |

STRUCTURES OF BRITTLE MATERIALS AND METALS

CROSS-REFERENCE TO RELATED APPLICATIONS

This application claims the benefits of a Japanese patent application 2004-169497 filed on Jun. 8, 2004 and a U.S. application Ser. No. 60/604,208 filed on Aug. 25, 2004, the entireties of which are incorporated herein by reference.

FIELD OF THE INVENTION

The present invention relates to a structure of a brittle material and a metal.

BACKGROUND OF THE INVENTION

Ceramic, cermet and glass materials are superior in high temperature resistance, wear resistance and corrosion resistance, and can be sufficiently used under severe circumstances in which metal and organic materials cannot be used. Ceramic, cermet and glass materials are basically hard and brittle, so that the mechanical processing is difficult and requires a high cost. The technical fields of use for these materials have been thus limited.

It has been studied to use a ceramic, cermet or glass material in a limited part and combine this with another material such as metal to improve the usability and to reduce the overall cost. It has been, however, observed that the materials are hard and brittle such that a stress, which is induced at the bonded position of the brittle material and another material due the difference of thermal expansion coefficients, often results in fracture, The application fields of the brittle materials have been thus very limited.

It has been tried to produce composites of various brittle materials and metals to solve the above problems. For example, according to Japanese patent No. 1809176B, for joining a ceramic material and an A1 member, it is proposed that an iron series alloy member and an intermediate metal member each having a thermal expansion coefficient between those of the ceramic material and alloy member are provided therebetween to provide a composite body of ceramic and metal whose thermal stress is reduced.

Further, according to patent No. 2050428B, it is proposed that ceramic and metal materials are joined with each other through an intermediate layer of a composite material having a specific composition to provide a bonded article of metal and ceramic having improved thermal resistance, reliability and a longer life.

SUMMARY OF THE INVENTION

The prior composite materials of ceramics and metal described in Japanese patent Nos. 1809176B and 2050428B, however, require materials each having a thermal expansion coefficient between those of the joined metal and ceramics. The kinds of intermediate materials are thus limited, and complex processing steps are required that result in a high production cost. Further, the entire stress in the joined article is substantially the same as that of a joined article of the same ceramics and metal without the intermediate material, the result of which may be problematic from a practical point of view.

An object of the present invention is to provide a joined body of a metal and a brittle material having high reliability and of a low production cost.

An object of the present invention is to provide a structure for enabling air-tight sealing of a brittle material and having excellent reliability against thermal cycles and corrosive substances.

According to a first aspect of the present invention, a plate-shaped metal member is pressed and clamped from both sides of the metal member in a direction of the thickness with a brittle material to fix the metal member. The ratio of the thickness of the metal member and that of the brittle material is limited so that a stress due to the difference of the physical properties (mainly thermal expansion coefficient, hardness and Young's modulus) of the brittle material and metal can be relaxed and reduced mainly due to the plastic and elastic deformations of the metal, even after the pressing and clamping process and under a use condition involving temperature change.

According to the present invention, the plate-shaped metal material is pressed and clamped at both sides in the direction of thickness with brittle materials having thermal expansion coefficients being substantially equivalent or the same as each other. It is thus possible to avoid the generation of stress between the opposing brittle material portions. Stress generated in the metal member provides a substantially uniform distribution with respect to a central plane passing through the center of the metal member in the direction of thickness. Further, the metal member has a thickness considerably smaller than that of the brittle material, so that the stress generated in the metal member is relaxed by the plastic deformation of the metal. It is thus possible to avoid the possibility of critical damages such as bending and crack formation of the metal member or considerable deformation, even after the press clamping and under the use condition involving temperature change.

Further, according to the first aspect of the present invention, a non-clamped portion is provided continuously with a clamped portion pressed and clamped with the brittle material. The non-clamped portion is provided independently from the brittle material to eliminate the interaction with the brittle material. The stress due to the difference of physical properties between the non-clamped portion and brittle material is thus avoided.

Further, the shape of the non-clamped portion can be designed independently from that of the clamped portion. It is thus possible to join the non-clamped portion with another metal member by means of any method such as welding, soldering and mechanical clamping without substantial limitations.

Separate metal members can be joined with each other by means of established, widely used and practical techniques. Such techniques can be combined with the present invention so that brittle materials, such as ceramic or glass or the like whose applications have been limited, can be freely joined with various shapes of metal members. The applications of the brittle materials can be thus considerably enlarged and therefore epoch-making.

According to the first aspect, preferably, the plate-shaped metal piece is embedded in a brittle material to press and clamp the metal piece with the brittle material.

When the brittle material is ceramics, the plate-shaped metal piece is generally embedded in a molded body during the molding process and then sintered, so that the metal piece is pressed and clamped due to the shrinkage of the molded body during the sintering process. Further, when the brittle material is a glass, the plate-shaped metal piece is inserted into molten glass, which is then cooled, so that the plate-shaped metal piece is pressed and clamped with the glass due to the shrinkage during the cooling process.

According to the present invention, the stress generated along the contact interface between the clamped portion of the plate-shaped metal piece and the brittle material is relaxed due to the deformation of the metal piece. The stress generated along the contact interface of the clamped portion and brittle material is generated, for example, due to the following mechanism. The thermal expansion coefficient of the metal material is represented by "α 1", the Young's modulus of the metal is represented by "E1", the thermal expansion coefficient of the brittle material is represented by "α 2" and the Young's modulus of the brittle material is represented by "E2". It is now provided that the metal material is embedded in the brittle material, and the brittle material is then sintered at a sintering temperature "T1" and cooled to room temperature so that the metal material is pressed and clamped with the brittle material. In this case, it is provided that both materials would not be deformed and would not slide along the interface, the stress "α 1" generated in the metal is represented by the following formula $$\alpha1 \propto E1 \times (T1\text{-room temperature}) \times (\alpha1\text{-}\alpha2) \quad (1)$$

The stress "α2" generated in the brittle material is similarly represented by the formula.

$$\alpha2 \propto E 2 \times (T1\text{-room temperature}) \times (\alpha2\text{-}\alpha1) \quad (2)$$

The combination of molybdenum and alumina is taken for the example. The thermal expansion coefficient and Young's modulus of molybdenum are about 5 ppm/° C. and about 330 GPa, respectively. The thermal expansion coefficient and Young's modulus of alumina are about 8 ppm/° C and about 360 GPa, respectively. For example, when alumina is sintered at 1500° C. and then cooled to room temperature, a compressive stress of about 1500 MPa is generated in molybdenum, provided that there is not plastic deformation of molybdenum. Similarly, a tensile stress of about 1600 MPa is generated in alumina.

Both of the stress values are beyond the strengths of the corresponding materials, so that such composite structure cannot be produced because of a fracture along the interface of the brittle material and metal.

However, a stress generated in the metal beyond the yield strength of the metal results in the plastic deformation. The magnitude of the deformation leading up to the point of fracture is represented by the elongation. Such elongation generally takes a considerably large value of several percent to several tens percent.

According to the present invention, the thickness of the metal material is made relatively smaller than that of the ceramic material, so as to generate a stress larger than the yield strength of the metal causing plastic deformation, so that the overall stress generated due to the difference of the thermal expansion coefficients is relaxed.

For example, it is provided that the metal member is made of a thin plate of molybdenum having a thickness of 100 micrometer, and the ceramic member is made of alumina having a thickness of 10 mm, the strain in the molybdenum plate required for deforming the molybdenum plate and for relaxing the stress is represented by the following formula (3).

$$\epsilon = (T1\text{-room temperature}) \times (\alpha1\text{-}\alpha2) \approx 0.5\% \quad (3)$$

The amount of deformation in the direction of the thickness is represented by the formula.

$$\Delta t = \epsilon \times t \approx 0.5 \text{ micrometer} \quad (4)$$

It is thus possible to relax the overall stress by a considerably small amount of deformation.

The combination of platinum and alumina is taken for example, the thermal expansion coefficient and Young's modulus of platinum are about 9 ppm/° C. and about 170 GPa, respectively, and the thermal expansion coefficient and Young's modulus of alumina are about 8 ppm/° C. and about 360 GPa, respectively. For example, when alumina is sintered at 1500° C. and then cooled to room temperature, a tensile stress of about 250 MPa is generated in platinum member provided that no plastic deformation is generated in platinum. Similarly, a compressive stress of about 530 MPa is to be generated in the alumina member.

Also in this case, when the platinum member is made of a thin plate having a thickness of 100 μm and the alumina member is made of a block having a thickness of 10 mm, the strain in the platinum member required for deforming the platinum thin plate and for relaxing it is represented by the above formula (3) and about 0.1 percent in this case. Although a tensile stress is generated in the platinum member in the direction of the pressing and clamping, only 0.1 percent of deformation in the direction of the depth of the platinum plate can relax the tensile stress. The amount of deformation is only 10 μm, provided that the depth of the pressing and clamping is 10 mm.

As described above, the stress is generated mainly due to the difference of thermal expansion coefficients of the brittle and metal materials in the composite structure of the materials and thus reflects a strain of about 1 percent or lower. On the other hand, the yield strength of the metal material is lower than the tensile strength and the elongation required for the fracture is several percent to several tens percent. The thickness of the metal material is made relatively smaller than that of the brittle material so as to generate a stress larger than the yield strength of the metal to cause the plastic deformation for relaxing the difference of the thermal expansion coefficients. Even in this case, the amount of deformation is in a range of the elongation so that the fracture of the metal material is avoided. Further, the metal material is deformed to relax the stress generated in the brittle material to provide a composite structure of the brittle material and metal. Such integrating may be performed by various methods. When the materials are integrated utilizing sintering shrinkage requiring thermal process at a high temperature, the relaxing of the stress can be performed also due to deformation of the metal material such as high temperature creep.

According to the first aspect, preferably, the plate-shaped metal piece is fixed on the surface of an inner supporting body made of a brittle material prepared in advance. An outer supporting body made of a brittle material and having a shape for surrounding the inner supporting body is prepared and fitted to the inner supporting body, so that plate-shaped metal piece is pressed and clamped between the supporting bodies. In this case, although it is preferred that the inner and outer supporting bodies are composed of materials having the same thermal expansion coefficients, the inner and outer supporting bodies may be made of different materials as far as the materials have thermal expansion coefficients close to each other.

According to the present embodiment, the method of fitting the outer supporting body will be described below.

When the outer supporting body is made of ceramics, the molded bodies of the inner and outer supporting bodies are prepared separately before the subsequent sintering process. The plate-shaped metal piece is set between the supporting bodies to prepare an assembly, which is then subjected to co-sintering. The metal piece is thus pressed and clamped due to the sintering shrinkage. The plate-shaped metal piece may be designed so that the inner and outer supporting pieces directly contact each other, so that the inner and outer supporting pieces are substantially integrated to provide a sealing structure having more excellent air-tightness.

The inner supporting body may be a sintered body sintered in advance, and the outer supporting body may be molded and then sintered in the integrating process. The shrinkage due to the sintering of the outer supporting body can thus provide a tighter fit. Also in this case, as described in the above combination of molded bodies, the plate-shaped metal piece may be designed so that the inner and outer supporting bodies directly contact each other, so that the inner and outer supporting bodies are substantially integrated to provide a sealing structure having more excellent air-tightness.

When the inner and outer supporting bodies are sintering bodies, the temperature of the outer supporting body is made higher than that of the inner supporting body to fit the outer supporting body onto the plate-shaped metal piece already fixed on the surface of the inner supporting body held at a low temperature. The pressing and clamping of the metal piece is thus realized.

When the outer supporting body is made of a glass, the inner supporting body prepared in advance and the plate-shaped metal piece fixed in advance are surrounded by molten glass, so that the molten glass is solidified to form the outer supporting body and the plate-shaped metal piece is pressed and clamped. Also in this case, as the above combination of the molded bodies, so that the inner and outer supporting pieces directly contact each other, the inner and outer supporting bodies are substantially integrated to provide a sealing structure having more excellent air-tightness.

According to the first aspect of the present invention, preferably, the brittle material is selected from the group consisting of glass, ceramics, single crystal and cermet.

Such glass includes quartz glass, aluminum silicate glass, borosilicate glass, silica-alumina-lithium series crystallized glass etc..

The ceramics includes, for example, ceramics having corrosion resistance against a halogen series corrosive gas, and may preferably be alumina, yttria, yttrium-aluminum garnet, aluminum nitride, silicon nitride or silicon carbide. Single crystals of any of the materials selected from the above may be used.

The cermet may be composite materials of a ceramics such as alumina, yttria, yttrium-aluminum garnet and aluminum nitride and a metal such as molybdenum, tungsten, hafnium and rhenium.

According to the first aspect, the difference of the thermal expansion coefficients of the brittle materials on the both side of the plate-shaped metal piece may preferably be 2 ppm or lower and more preferably be 1 ppm or lower. Most preferably, the thermal expansion coefficients are the same. The thermal expansion coefficients of the both brittle materials may be thus adjusted to further improve the stability and reliability of the inventive structure of brittle material and metal against thermal cycles.

According to the first aspect, the thickness of the plate-shaped metal piece may preferably be 1000 µm or smaller, and more preferably be 200 µm or smaller. The thickness of the plate-shaped metal piece is thus made smaller, so as to deform the plate-shaped metal piece to reduce stress generated between the metal piece and brittle material. The air-tightness of the structure can be further improved. If the plate-shaped metal piece is too small, however, the strength of the metal piece as a structural body tends to be insufficient. On that viewpoint, the thickness of the plate-shaped metal piece may preferably be 20 µm or larger and more preferably be 50 µm or larger.

According to the first aspect, preferably, the thickness of the outer supporting body may preferably be 0.1 mm or larger. It is thus possible to sufficiently improve the pressure from the outer supporting body onto the plate-shaped metal piece in radial directions, so that the air-tightness between them can be further improved. On that viewpoint, the thickness of the outer supporting body may preferably be 0.3 mm or larger. The embodiment is particularly suitable for pressure sealing of the plate-shaped metal piece utilizing the difference of thermal expansion coefficients of the outer and inner supporting bodies.

According to a preferred embodiment, the minimum length of pressure bonding in the clamped portion is 10t or larger, and the minimum length of the non-clamped portion of the plate-shaped metal piece is 5t or larger, and the minimum thickness of the brittle material in the direction of the minimum thickness of the metal piece is 5t or larger, provided that the minimum thickness of the plate-shaped metal piece is "t". It is thus possible to obtain a structure having excellent reliability and a high tensile strength of the metal piece.

A second aspect of the present invention provides a structure of brittle material and metal, comprising an outer supporting body comprising a tube-shaped portion made of a brittle material, a pipe-shaped inner supporting body provided inside of the outer supporting body, made of brittle material and having a length in the direction of the pipe axis smaller than that of the outer supporting body, and a plate-shaped metal piece provided between the outer and inner supporting bodies. The outer supporting body and the plate-shaped metal piece directly contact each other, and the metal piece and outer supporting body directly contact each other. Further, the outer supporting body and the pipe-shaped inner supporting body directly and partly contact each other.

Further, a second aspect of the present invention provides a structure of brittle material and metal, comprising an inner supporting body comprising a tube-shaped portion made of a brittle material, an outer supporting body provided outside of the inner supporting body made of brittle material and having a length in the direction of the pipe axis smaller than that of the inner supporting body, and a plate-shaped metal piece provided between the inner and outer supporting bodies. The inner supporting body and the plate-shaped metal piece directly contact each other, and the metal piece and the outer supporting body directly contact each other. Further, the inner and outer supporting bodies directly and partly contact each other.

According to the second aspect of the present invention, it is provided that the tube-shaped portion made of a brittle material, an outer supporting body made of a brittle material and provided outside of the tube shaped portion, and a plate-shaped metal piece be provided between the tube-shaped portion and metal piece. The tube-shaped portion and metal piece are directly contacting each other, and the metal piece and outer supporting body are directly contacted with each other. Such structure does not require frit and cement materials essential for prior structures, such that the resulting structure is reliable in strength, excellent in corrosion resistance and in air-tightness.

A third aspect of the present invention provides a structure comprising a first portion comprising a ceramic or cermet material, a second portion comprising a ceramic or cermet material, and a plate-shaped metal piece provided between the first and second portions. The metal piece is pressed and clamped with the first and second portions to provide air-tight sealing.

According to the third aspect of the present invention, the first portion comprising a ceramic or cermet material, the second portion comprising a ceramic or cermet material, and the plate-shaped metal piece inserted between the first and second portions, which is pressure bonded with the first and second portions are provided. It is thus possible to pressure bond the metal piece with cermet or ceramics to provide a novel structure, preferably for air-tight sealing. According to the prior art, it is known to pinch seal, in which a metal foil is inserted into an opening at the end of a glass container and the glass is softened and deformed to provide air-tight sealing using the metal foil. It has not been known to provide air-tight sealing using ceramics or cermet which is resistive to softening and deformation.

According to the second aspect of the present invention, the brittle material is selected from the group consisting of glass, ceramics and cermet. Further, according to the third aspect of the present invention, the brittle material is ceramics or cermet.

Such glass includes quartz glass, aluminum silicate glass, borosilicate glass, silica-alumina-lithium series crystallized glass etc..

The ceramics include, for example, ceramics having corrosion resistance against a halogen series corrosive gas, and may preferably be alumina, yttria, yttrium-aluminum garnet, aluminum nitride, silicon nitride or silicon carbide.

The cermet may be composite material of a ceramics such as alumina, yttria, yttrium-aluminum garnet and aluminum nitride and a metal such as molybdenum, tungsten, hafnium and rhenium.

According to the second and third aspects, the difference of thermal expansion coefficients of the tube-shaped portion and outer supporting body may preferably be 2 ppm or smaller, and more preferably be 1 ppm or smaller, and most preferably the same. The thermal expansion coefficients of both may be adjusted with each other, so that the stability and reliability of the inventive structure of brittle material and metal against thermal cycles can be further improved.

According to the second and third aspects, preferably, the tube-shaped portion and outer supporting body are composed of sintered bodies having different sintering shrinkage, so that the plate-shaped metal piece is pressure bonded with the difference of shrinkage during the sintering process. A preferred value of the difference of shrinkages will be described below.

The material of the tube-shaped portion may be selected from a sintered body, a single crystal and glass, and that of the outer supporting body may be composed of a molded body subjected to sintering shrinkage.

According to the second and third aspects, preferably, the thickness of the plate-shaped metal piece may preferably be 1000 µm or smaller, and more preferably be 200 µm or smaller. The thickness of the plate-shaped metal piece may be made smaller as described above, to cause the deformation of the metal piece. It is thus possible to reduce the stress generated between the metal piece and brittle material and to further improve the air-tightness of the structure. If the plate-shaped metal piece is too thin, however, the strength of the structural body tends to be insufficient. On that viewpoint, the thickness of the metal piece may preferably be 20 µm or larger, and more preferably be 50 µm or larger.

According to the second and third aspects, preferably, the thickness of the outer supporting body is 0.1 mm or larger. It is thus possible to sufficiently increase the pressure from the outer supporting body onto the plate-shaped metal piece radially, so as to further improve the air-tightness between the outer supporting body and tube-shaped portion. On that viewpoint, the thickness of the outer supporting body may more preferably be 0.5 mm or larger. The present embodiment is particularly preferred in pressure sealing of the plate-shaped metal piece utilizing the difference of the sintering shrinkage of the outer supporting body and tube-shaped portion.

BRIEF DESCRIPTION OF THE DRAWINGS

FIG. 15 is a cross sectional view showing a sealed structure 15 having an outer supporting body 2, an inner supporting body 4 and a metal member 3 with a plate-shaped metal piece 3a.

FIG. 16 is a cross sectional view showing a sealed structure 15 having an outer supporting body 4, an inner supporting body 2 and a metal member 3 with a plate-shaped metal piece 3a.

DETAILED DESCRIPTION OF THE INVENTION

Figure 1:
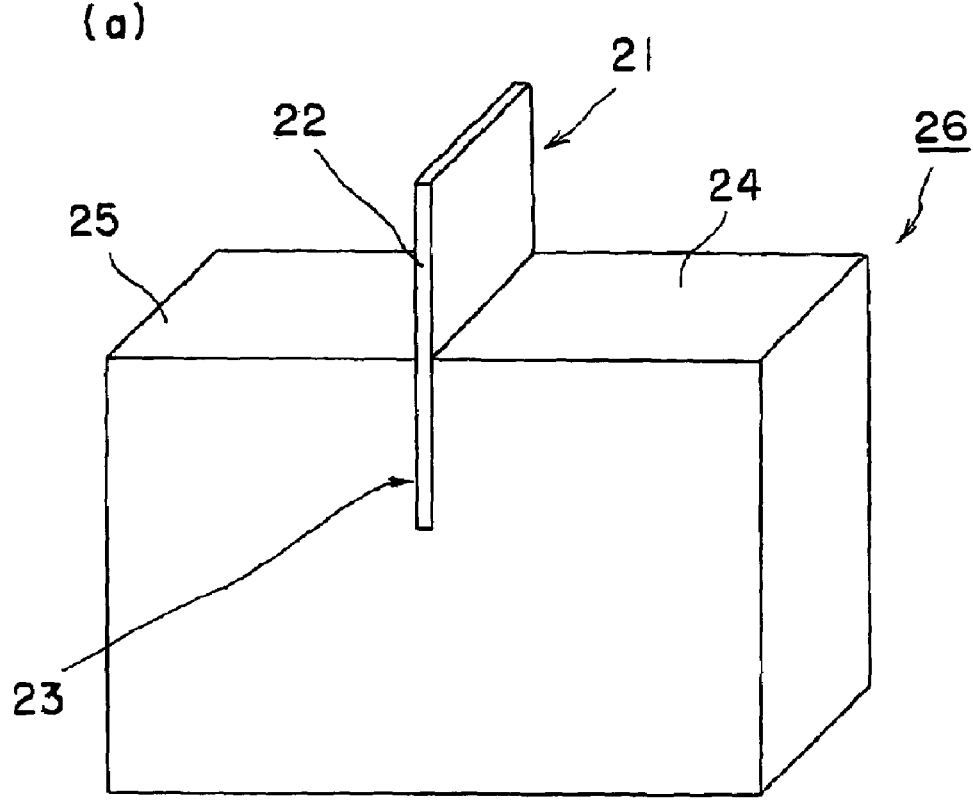
FIG. 1(a) is a perspective view of a structure 26.
FIG. 1(b) is a cross sectional view of the structure of FIG. 1(a).
Figure 1:
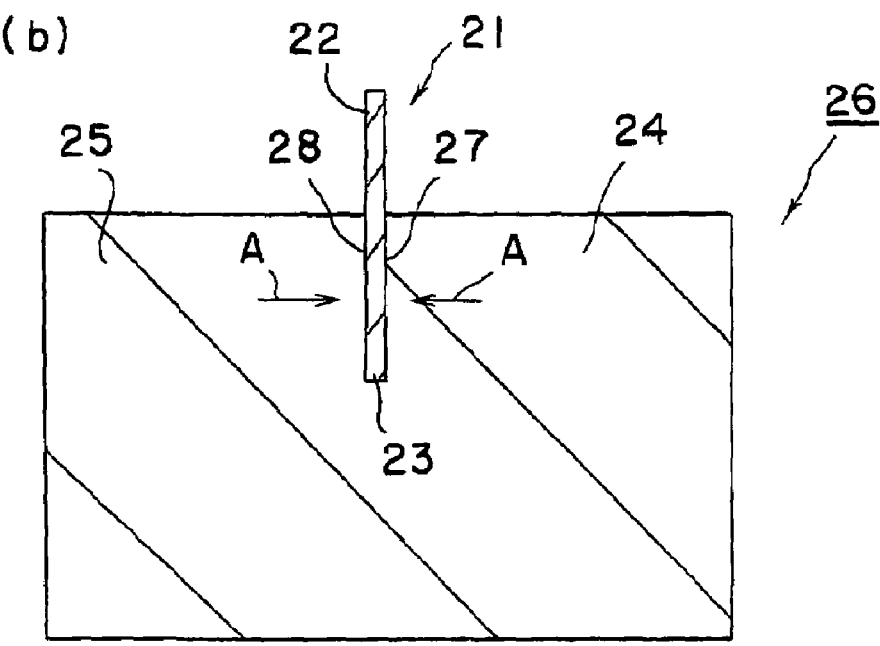

The present invention will be described concerning the examples, referring to the attached drawings below.

According to an example shown in FIGS. 1(a) and 1(b), a structure 26 has a flat plate-shaped metal piece 21 clamped between a first portion 24 and a second portion 25 each made of a brittle material. Specifically, the clamped portion 23 as the lower half of the plate-shaped metal piece 21 is held between the portions 24 and 25 of brittle materials, and the upper half is protruded as a non-clamped portion 22 into the upper space of the brittle materials. Both sides 27 and 28 of the clamped portion 23 are pressed in the direction as represented by arrow "A", so that the clamped portion 23 of the plate-shaped metal piece 21 is deformed to absorb and relax the stress due to the difference of physical properties of the brittle materials 24, 25 and metal. The amount of the deformation required to relax the stress is very low as described below, so that the difference of the non-clamped and clamped portions is not substantially depicted in the Drawings (it will be the same below).

According to a structure 26 shown in FIGS. 2(a) and (b), a flat plate-shaped metal piece 21 is clamped between a first portion 24 and a second portion 25, each made of a brittle material. Specifically, the lower half as a clamped portion 23 of the plate-shaped metal piece 21 clamped with the brittle materials 24 and 25, and the upper half as a non-clamped portion 22 is protruded into the upper space of the brittle material. Both sides 27 and 28 of the clamped portion 23 are pressed in the direction as shown by arrow "A", so that the clamped portion 23 of the plate-shaped metal piece 21 is deformed to absorb and relax the stress due to the difference of physical properties of the brittle materials 24, 25 and metal. According to the present example, the clamped portion 23 as well as the first portion 24 and second portion 25 are surrounded by the brittle material, so that the clamped portion 23 is embedded within the brittle materials.

Figure 3:
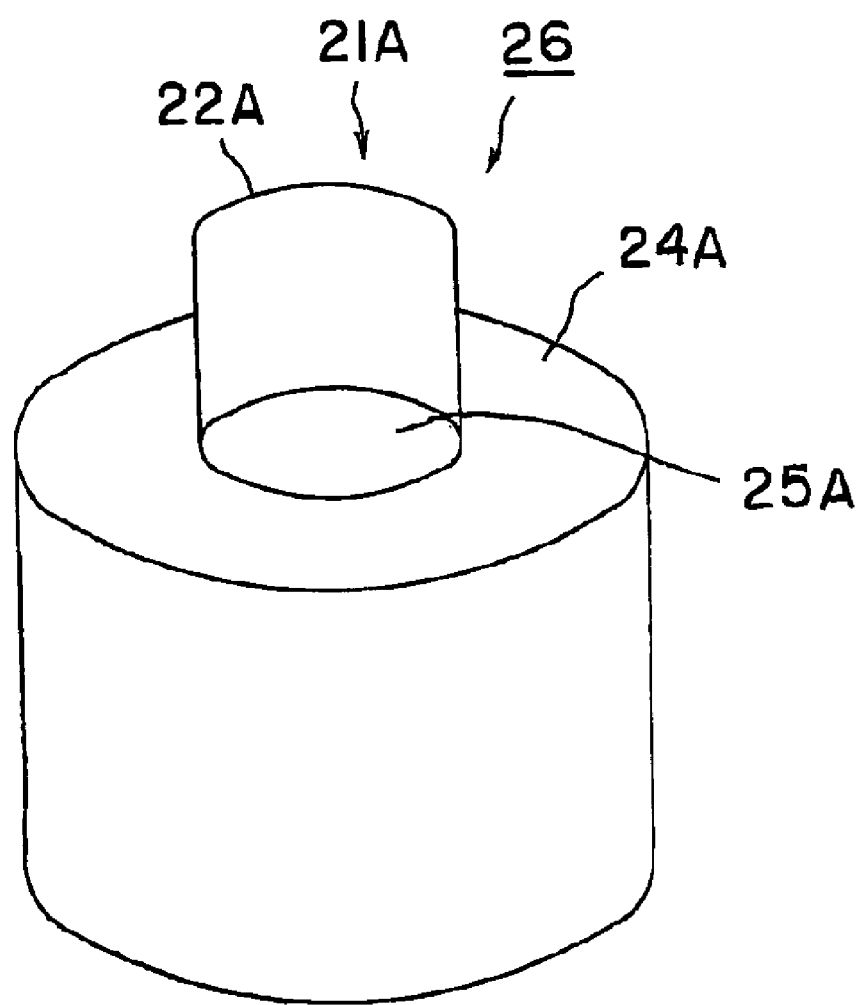
FIG. 3 is a perspective view showing a structure 26, having a curved and plate-shaped metal piece inserted between outer and inner supporting bodies.

According to a structure 26 shown in FIG. 3, an outer supporting body 24A is made of brittle material and substantially has a shape of a cylinder. An inner supporting body 25A is made of brittle material and substantially has a shape of a column or a cylinder. A curved plate-shaped portion 21A is clamped and fixed between the outer supporting body 24A and the inner supporting body 25A. In FIG. 3, a non-clamped portion 22A is protruded from the brittle material, and the clamped portion is embedded within the brittle material, so that the clamped portion is not observed from the outside.

Figure 4:
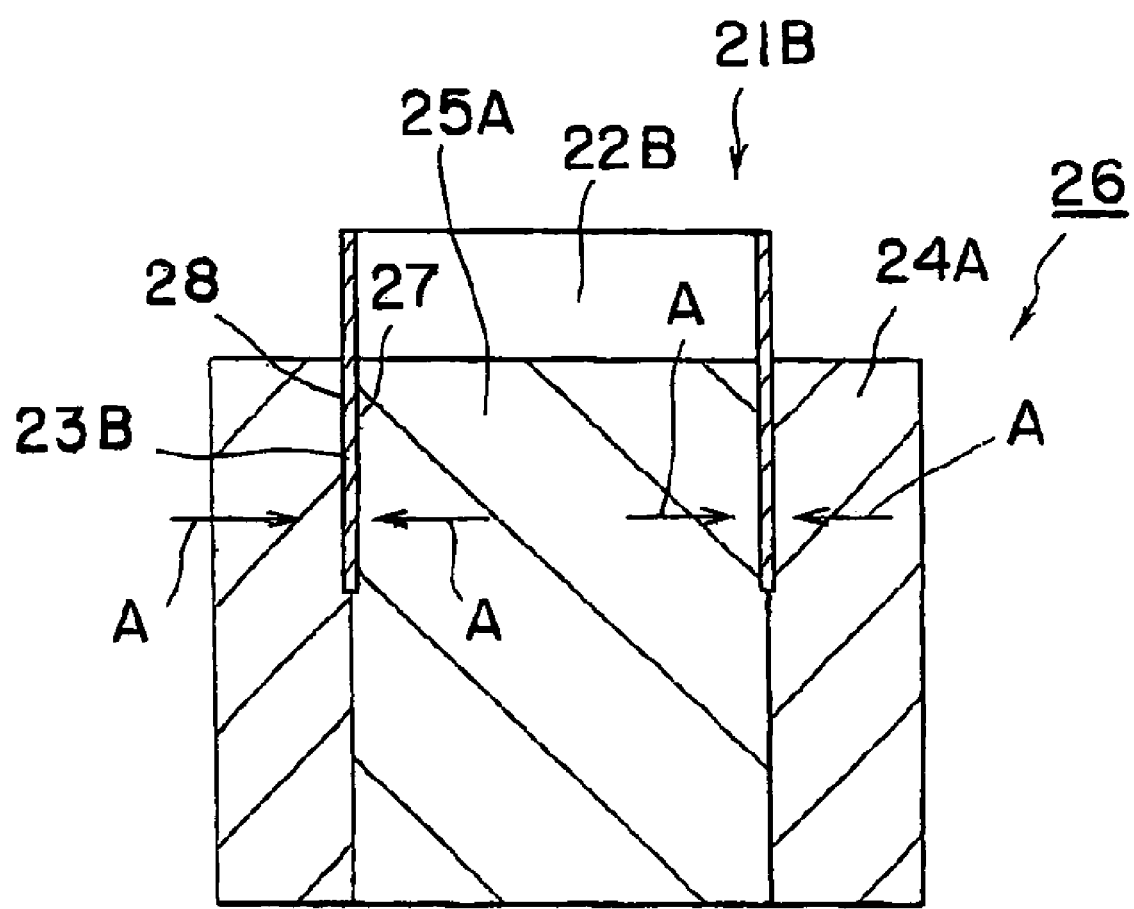
FIG. 4 is a cross sectional view schematically showing a structure having a cylindrical plate-shaped metal piece and inner and outer supporting bodies sandwiching the metal piece.

According to a structure 26 shown in FIG. 4, an outer supporting body 24A is made of brittle material and substantially has a shape of a cylinder. An inner supporting body 25A is made of a brittle material and substantially has a shape of a column or a cylinder. A seamless and cylindrical plate-shaped body 21B is clamped and fixed between the outer supporting body 24A and inner supporting body 25A. The non-clamped portion 22B is protruded from the brittle material and the clamped portion 23B is embedded in the brittle material. Both sides 27 and 28 of the clamped portion 23B is pressed as an arrow "A" direction, so that the clamped portion 23B of the plate-shaped metal piece 21B is deformed to absorb and relax the stress due to the difference of physical properties of the brittle materials 24A and 25A and metal. Further, the outer and inner supporting portions directly contact each other direct under the clamped portion.

Figure 5:
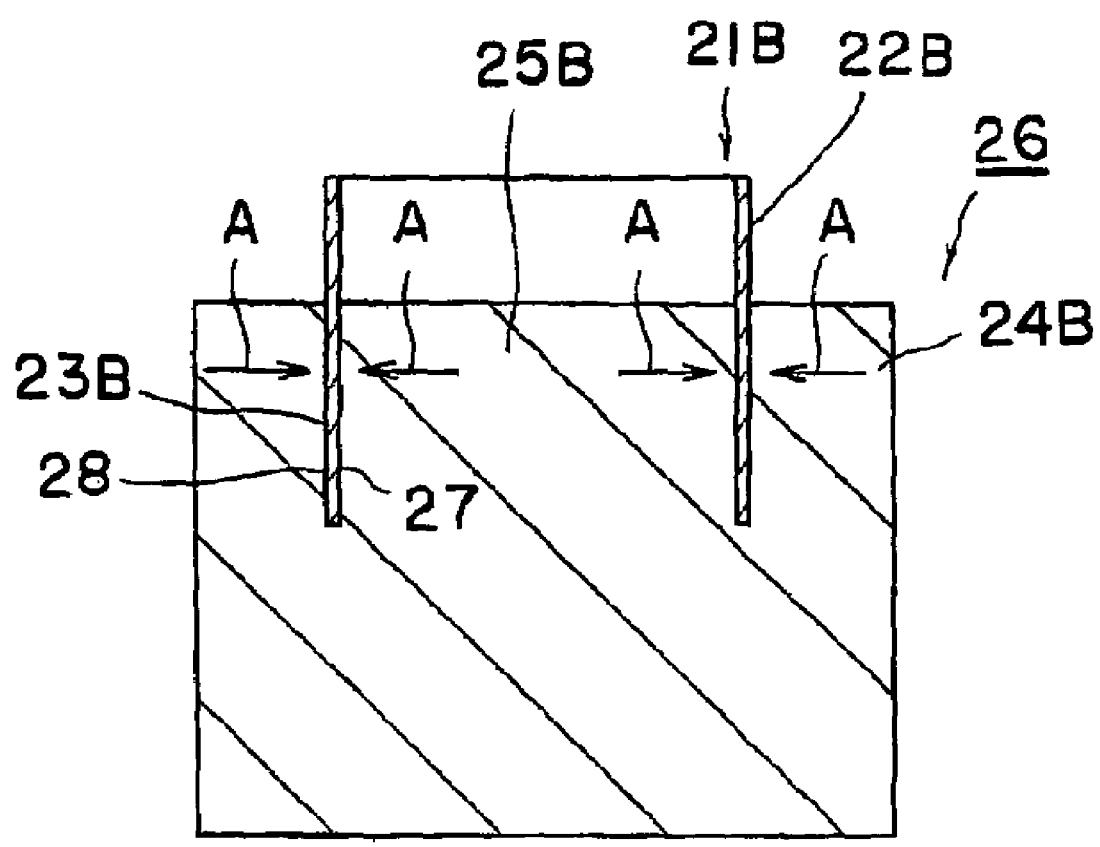
FIG. 5 is a cross sectional view schematically showing a cylindrical plate-shaped metal piece, and inner and outer supporting bodies sandwiching the metal piece.

According to a structure shown in FIG. 5, an outer supporting body 24B is made of brittle material and substantially has a shape of a cylinder. An inner supporting body 25B is made of a brittle material and substantially has a shape of a column or a cylinder. A seamless and cylindrical plate-shaped body 21B is clamped and fixed between the outer supporting body 24B and inner supporting body 25B. The non-clamped portion 22B is protruded from the brittle material and the clamped portion 23B is embedded in the brittle material. Both sides 27 and 28 of the clamped portion 23B are pressed in the direction as shown by arrow "A", so that the clamped portion 23B of the plate-shaped metal piece 21B is deformed to absorb and relax the stress due to the difference of physical properties of the brittle material portions 24B and 25B and metal. Further, the outer and inner supporting portions are substantially integrated directly under the clamped portion by the co-sintering or melting so that the ceramic or glass microstructure is made continuous.

Figure 6:
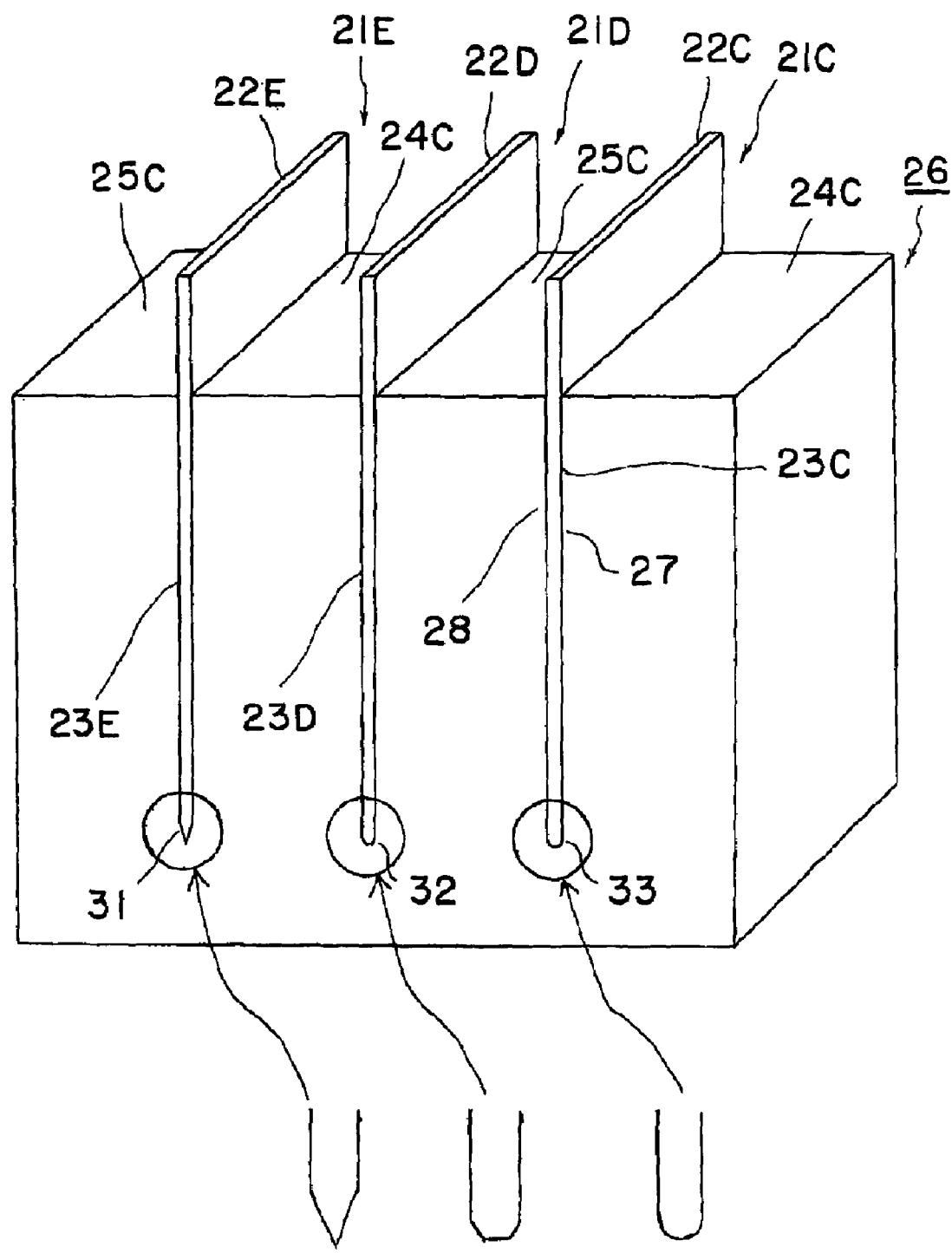
FIG. 6 is a perspective view schematically showing structures clamping plate-shaped metal pieces having tip ends of a knife-edge shape, C-plane and R-plane, respectively.

According to an example shown in FIG. 6, brittle material portions 24C, 25C, 24C and 25C are arranged in series, and flat-plate-shaped metal pieces 21C, 21D and 21E are clamped between the adjacent brittle material portions, respectively. Specifically, the clamped portions 23C, 23D and 23E, the lower halves of the metal pieces 21C, 21D and 21E, are sandwiched by the brittle material portions 24C and 25C, and the upper halves are protruded into the upper space of the brittle materials as non-clamped portions 22C, 22D and 22E, respectively. Both sides 27 and 28 of each of the clamped portions 23C, 23D and 23E are pressed, so that each clamped portion is deformed to absorb and relax the stress due to the difference of physical property of the brittle material and metal.

For example, a knife edge-shaped portion 31 is provided at the tip end of the clamped portion 23E, a chamfered edge portion 32 is provided at the tip end of the clamped portion 23D, and a radiused edge portion 33 is provided at the tip end of the clamped portion 23C. It is thus possible to improve the wettability of the quartz glass and the metal piece at the contact point at the tip end. For example, as shown in FIG. 1, when a corner (sharp portion) is left at the tip end of the clamped portion, microcracks may be observed starting from the corner in some samples. However, such cracks are not observed by applying the knife edge, chamfered or radiused shape at the tip end of the clamped portion as shown in FIG. 6, resulting in a reduction of the stress.

Figure 7:
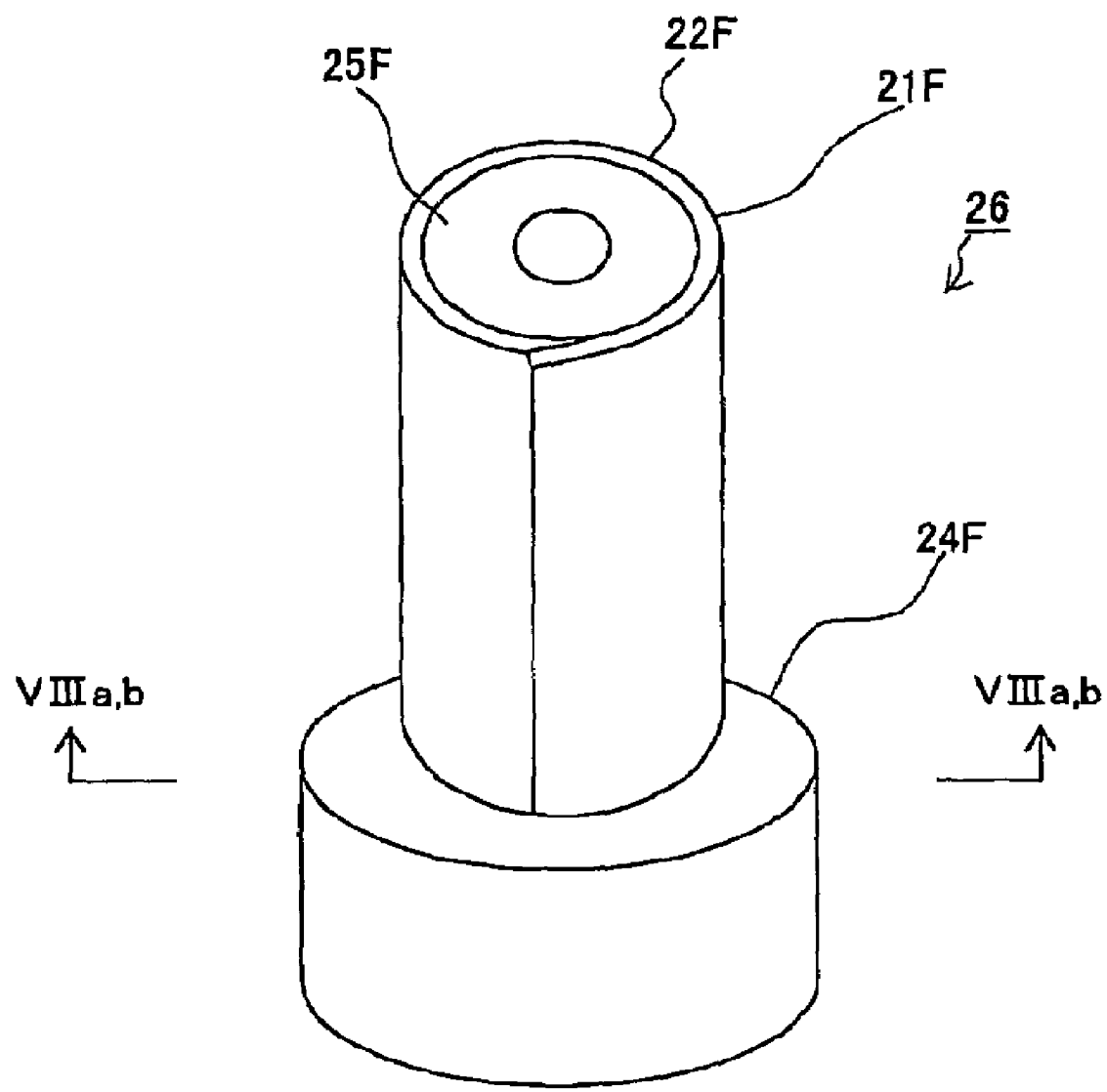
FIG. 7 is a perspective view showing a structure obtained by inserting a cylindrical plate-shaped metal piece 21F between outer and inner supporting bodies.
Figure 8:
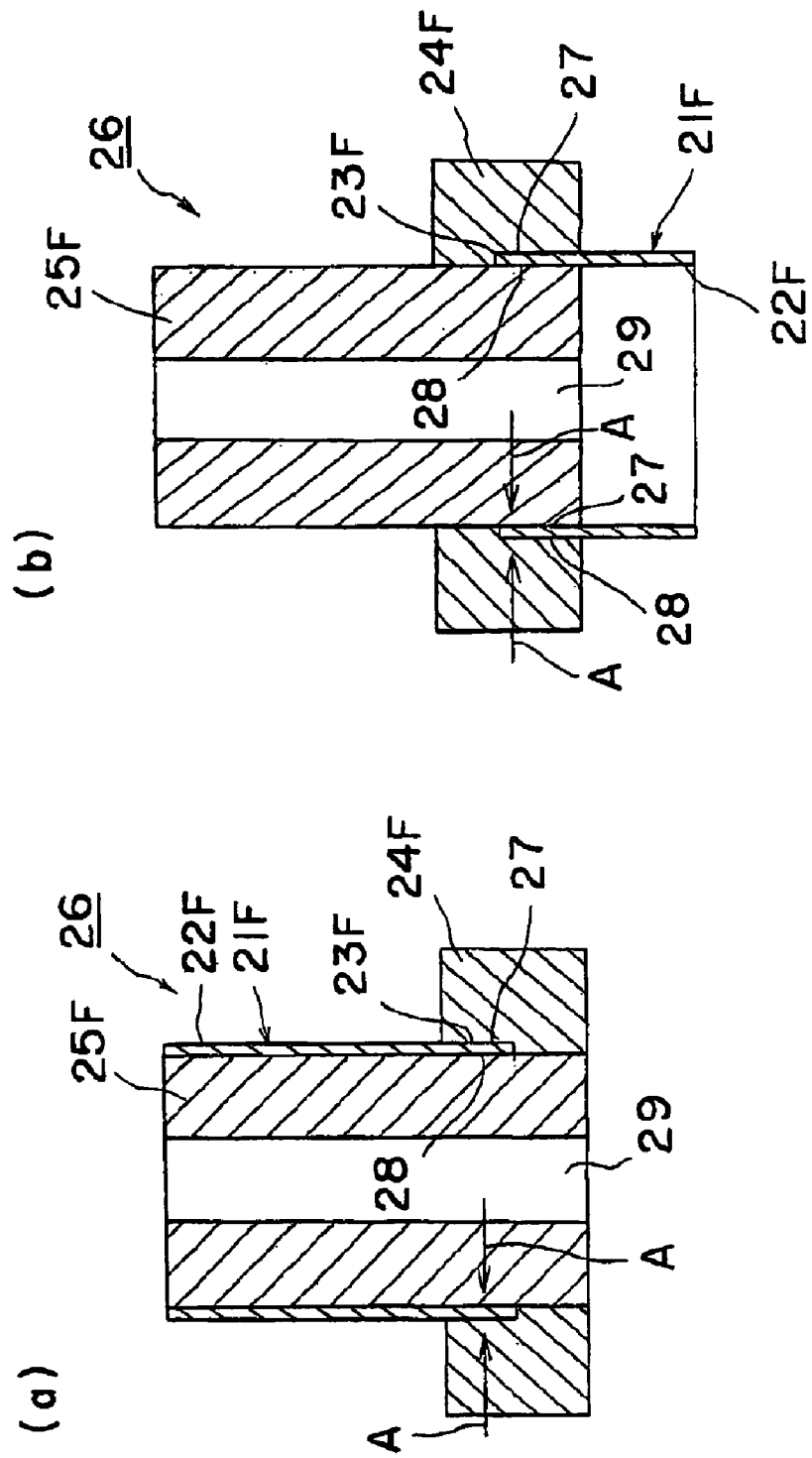
FIGS. 8(a) and 8(b) are cross sectional views each showing a structure obtained by inserting a cylindrical plate-shaped metal piece 21F between outer and inner supporting bodies.
FIG. 8(c) is a cross sectional view schematically showing a method of leakage test by means of a helium leakage detector.

According to a structure 26 shown in FIG. 7 and FIG. 8(a), an outer supporting body 24F is made of brittle material and substantially has a shape of a cylinder. An inner supporting body 25F is made of brittle material and substantially has a shape of cylinder. A cylindrical plate-shaped metal piece 21F is clamped and fixed between the outer supporting body 24F and inner supporting body 25F. A non-clamped portion 22F is protruded from the brittle material, and a clamped portion 23F is embedded in the brittle material. Both faces 27 and 28 of the clamped portion 23F are pressed as arrows "A" direction to deform the clamped portion 23F of the plate-shaped metal piece 21F and thereby to absorb and relax the stress due to the difference of physical properties of the brittle material portions 24F, 25F and the metal. Further, the outer and inner supporting bodies are contacted with each other direct under the clamped portion. The outer supporting body 24F is shorter than that of the inner supporting body 25F.

According to a structure shown in FIG. 8(b), an outer supporting body 24F is made of brittle material and substantially has a shape of a cylinder. An inner supporting body 25F is made of brittle material and substantially has a shape of a cylinder. A seamless and cylindrical plate-shaped metal piece 21F is clamped and fixed between the outer supporting body 24F and inner supporting body 25F. A non-clamped portion 22F is protruded from the brittle material, and a clamped portion 23F is embedded within the brittle material. Both faces 27 and 28 of the clamped portion 23F are pressed as shown by arrows "A" to deform the clamped portion 23F of the metal piece 21F and thereby to absorb and relax the stress due to the difference of physical property of the brittle material portions 24F, 25F and metal. The outer supporting body 24F is shorter than that of the inner supporting portion 25F.

Figure 9:
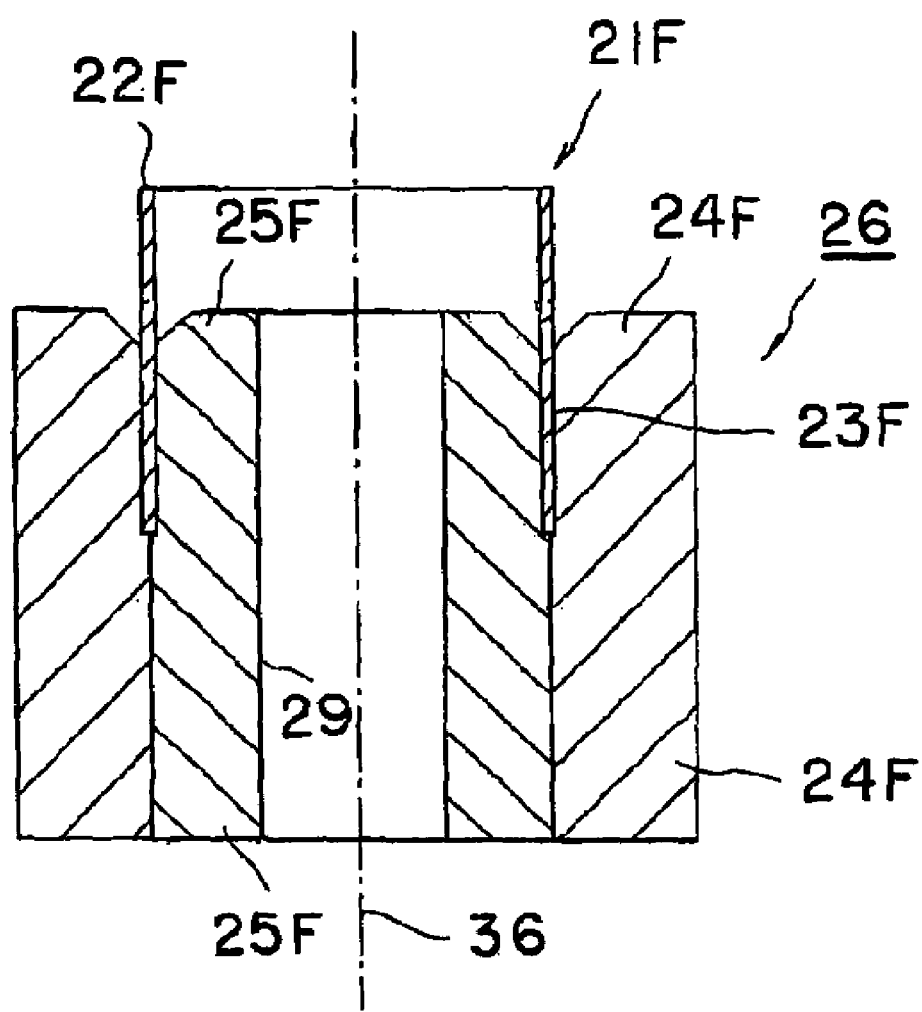
FIG. 9 is a cross sectional view schematically showing a structure obtained by inserting a cylindrical plate-shaped metal piece 21F between outer and inner supporting bodies.

A structure shown in FIG. 9 is substantially the same as that shown in FIG. 8(b). A through hole 29 is formed inside of an inner supporting body 25F. Further, the tube axes 36 of an inner supporting body 25F, an outer supporting body 24F and a seamless and cylindrical plate-shaped metal piece 21F are substantially identical.

Figure 10:
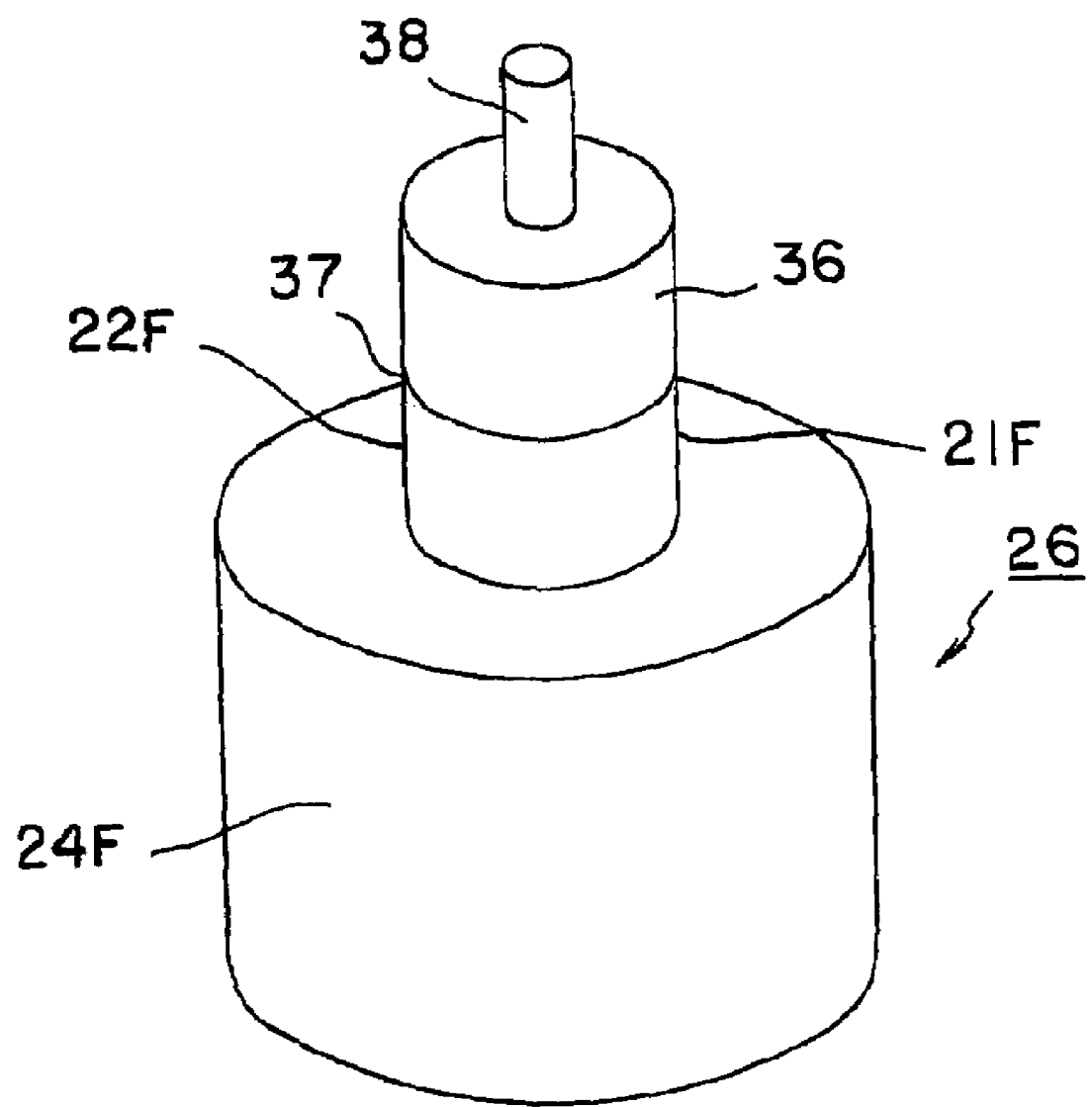
FIG. 10 a perspective view schematically showing the structure of FIG. 7 joined with an outer metal member 36.

According to an example shown in FIG. 10, the structure of FIG. 9 is joined with an outer metal member. That is, a non-clamped portion 22F protruding upwardly from the outer supporting body 24F is bonded with another cylindrical metal member 36 at 37 by means of a known method of metal bonding such as welding. A capillary 38 is fitted to the metal member 36. The capillary is used, for example, as a guide for inserting a rod-shaped current through conductor and electrode material or a welding portion for forming air-tight sealing.

Figure 11:
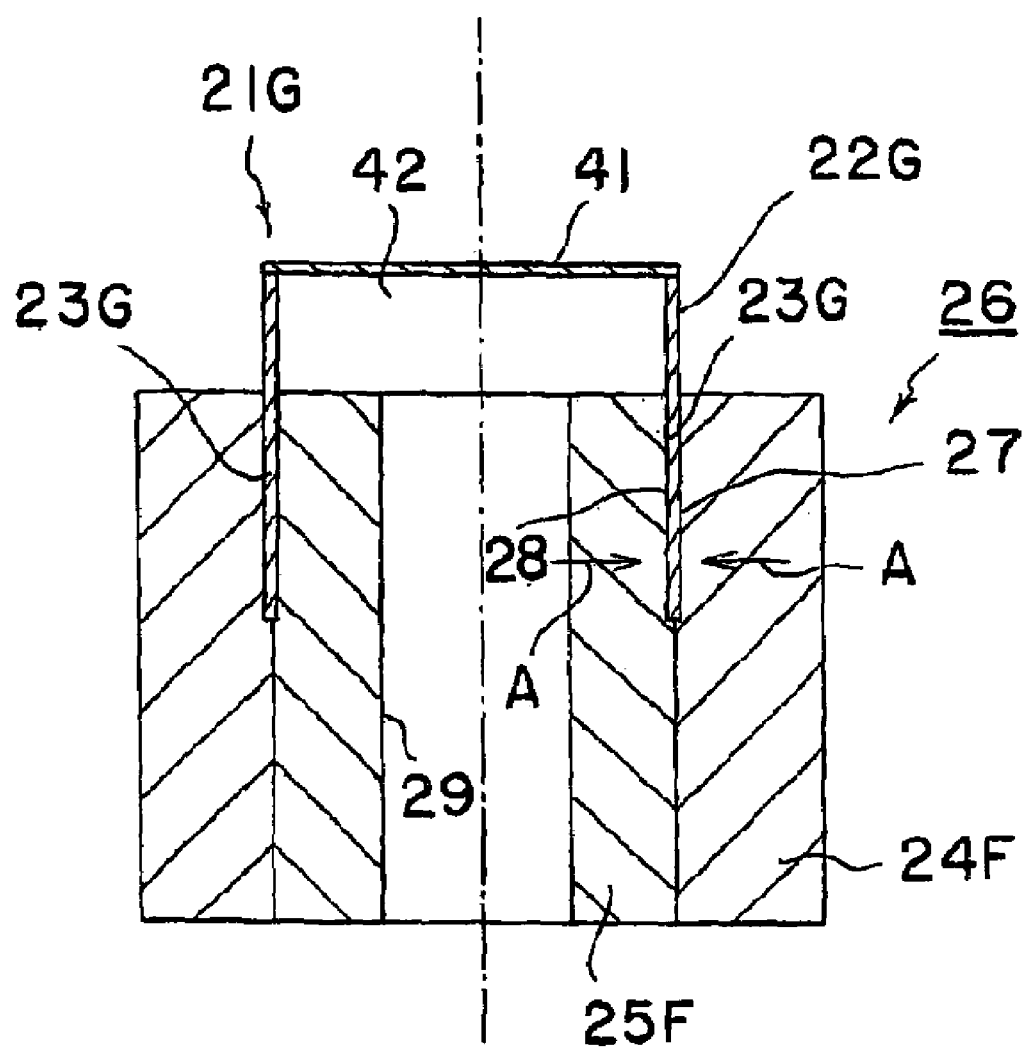
FIG. 11 is a cross sectional view schematically showing a structure obtained by inserting a cylindrical plate-shaped metal piece 21G between outer and inner supporting bodies, in which a cover 41 is provided in the metal piece.

According to a structure 26 shown in FIG. 11, an outer supporting body 24F is made of brittle material and substantially has a shape of a cylinder. An inner supporting body 25F is made of brittle material and substantially has a shape of cylinder with a through hole. A cylindrical plate-shaped metal piece 21G is clamped and fixed with the outer supporting body 24F and inner supporting body 25F. A non-clamped portion 22G is protruded from the brittle material, and a clamped portion 23G is embedded within the brittle material. Both faces 27 and 28 are pressed as by arrows "A" to deform the clamped portion 23G of the plate-shaped metal piece 21G and to absorb and relax the stress due to the difference of physical property of the brittle material portions 24F, 25F and metal. Further, the outer and inner supporting portions are contacting each other directly under the clamped portion. A cover portion 41 is integrated with the tip end of the clamped portion 23G in a seamless manner to form a closed space 42 inside of the cover portion 41.

The examples of the first, second and third aspects of the present invention will be described further in detail, referring to the attached drawings.

Figure 12:
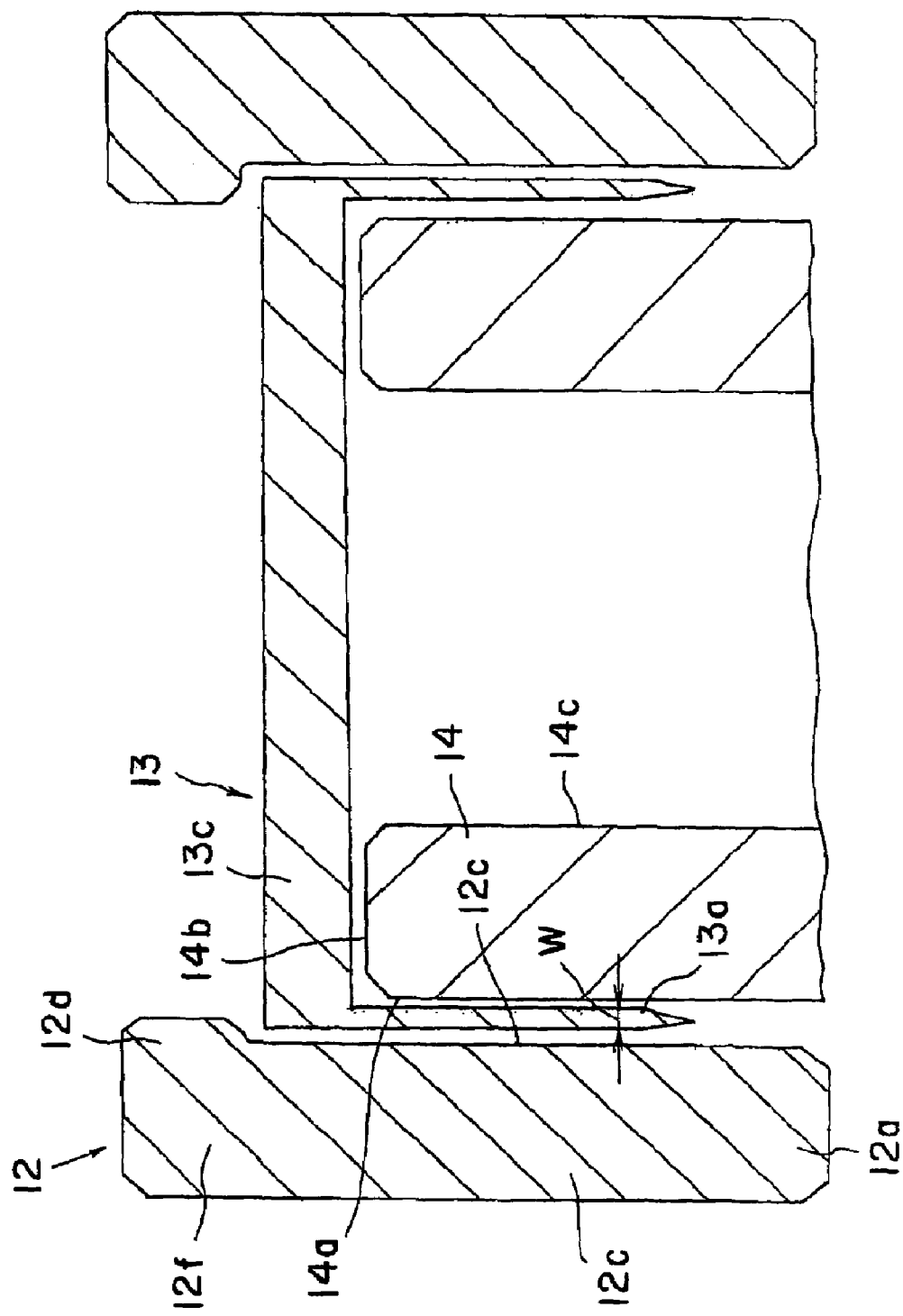
FIG. 12 is a cross sectional view showing a molded body 12 for outer supporting body, a metal member 13 and a molded body 14 for tube-shaped body used for producing a composite body of a brittle material and metal according to an embodiment of the present invention.
Figure 13:
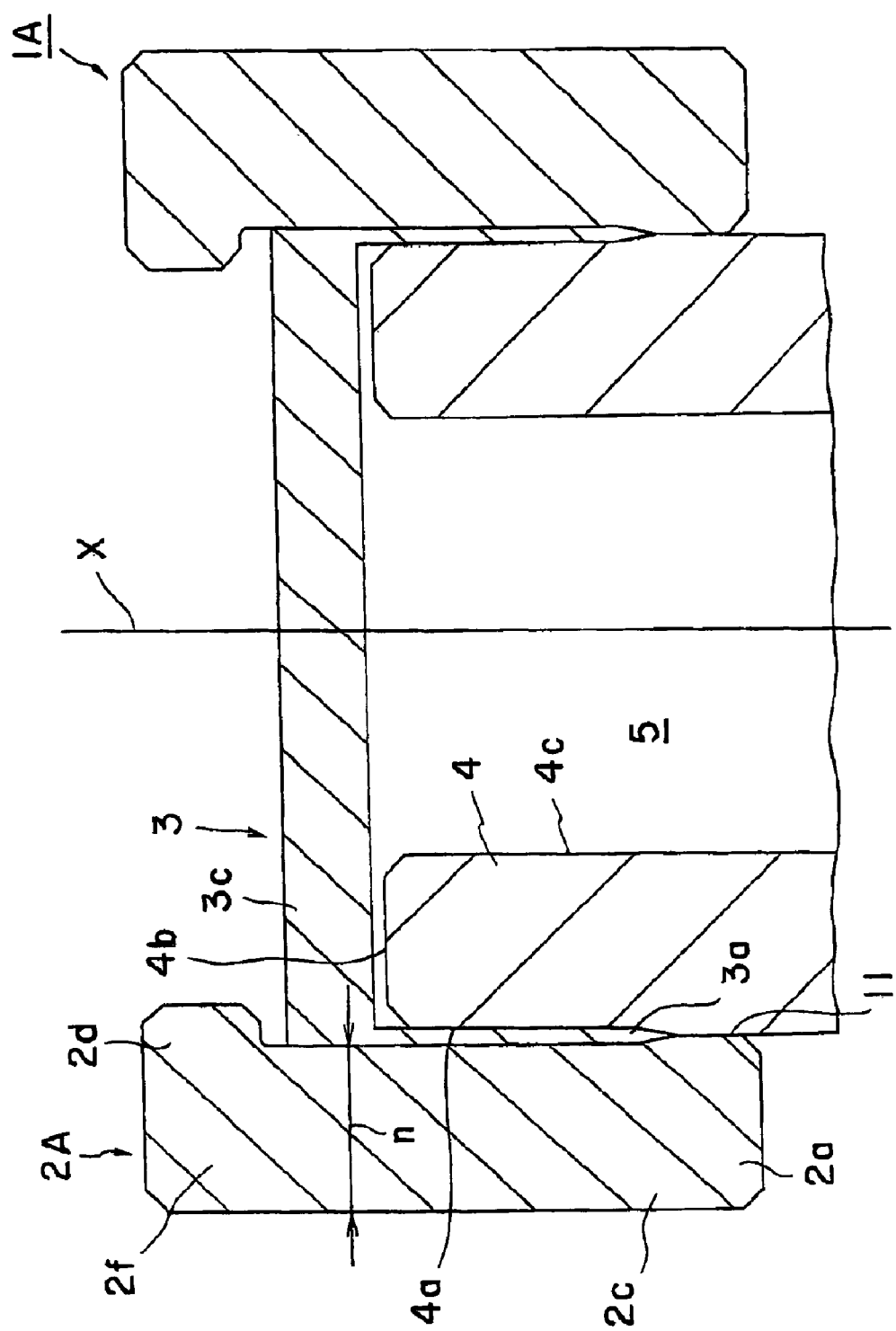
FIG. 13 is a cross sectional view showing a composite body 1A of brittle material and metal obtained by sintering the molded bodies 12 and 14 of FIG. 12.

FIG. 12 is a cross sectional view schematically showing a body 12 to be sintered for an outer supporting body, a metal member 13 having a plate-shaped metal piece 13a and a protruding portion (cover portion) 13c, and a sintered body 14 for tube shaped portion assembled. FIG. 13 is a cross sectional view schematically showing a structure of brittle material-metal formed by the sintering shrinkage of the outer supporting body.

In FIG. 12, the body 12 to be sintered is composed of ceramic powder or mixture for cermet of ceramic powder and metal powder. Such powder may contain an organic binder or an additive such as a sintering aid. Further, the body 12 to be sintered may be a molded body of the powder, or the calcined body or dewaxed body of the molded body. It is required, however, that the body to be sintered is shrunk after the sintering process.

The body 14 to be sintered is composed of a ceramic powder, or mixture for cermet of ceramic powder and metal powder, similarly as the body 12 to be sintered. Such powder may contain an organic binder or an additive such as a sintering aid. Further, the body 14 to be sintered may be the molded body of each powder, or the calcined body or dewaxed body of the molded body. It is, however, required that the sintering shrinkage of the body 12 to be sintered be larger than that of the body 14 to be sintered.

The material of the body 14 to be sintered may be selected from materials whose densification is already complete such as a sintered body, single crystal glass or the like.

The body 12 to be sintered has a pressing portion 12c for a plate-shaped metal piece 13a, a flange portion 12a extending downwardly from the pressing portion 12c, a cylindrical portion 12f extending from the pressing portion 12c toward the end, and a ring-shaped protrusion 12d extending from the cylindrical portion 12f toward the inside. Further, the body 14 to be sintered has a shape of a cylinder or barrel. 14a represents an outer wall surface, 14b represents an end surface, and 14c represents an inner wall surface. At the step of FIG. 12 (before sintering), a clearance is formed between the body 12 to be sintered and the metal member 13, and a clearance is formed between the metal member 13 and the body 14 to be sintered.

The body 12 to be sintered and the body 14 to be sintered are then sintered for the densification. As shown in FIG. 13, a tube-shaped portion 4 and outer supporting body 2A are generated whose diameters are made smaller. The outer supporting body 2A has a pressing portion 2c for pressing the plate-shaped metal piece 3a, a flange portion 2a extending downwardly from the pressing portion 2c, a cylindrical portion 2f extending from the pressing portion 2c toward the end portion, and a ring-shaped protruding portion 2d protruding inwardly from the cylindrical portion 2f. The tube-shaped portion 4 has a shape of a cylinder or a barrel. 4a represents an outer wall surface, 4b represents an end face and 4c represents an inner wall surface. The tube-shaped portion 4 and outer supporting body 2A directly contact each other along an interface 11 and each crystal is integrated without a bonding layer at the boundary of the two parts.

During the sintering step, the outer diameter of the resulting sintered body of the molded body 14 for the tube-shaped portion 4 is made larger than the inner diameter of sintered body of the molded body 12 for the outer supporting body 2A, if each of the molded bodies is subjected to sintering alone. It is thus possible to apply a pressing force from the outer supporting body 2A and tube-shaped portion 4 to the plate-shaped metal piece 3a radially during the sintering step, so as to improve the adhesion and air-tightness.

On that viewpoint, the ratio (RO/RI) may preferably be 1.04 or higher and more preferably be 1.05 or higher, provided that "RO" represents the outer diameter of the sintered body obtained by sintering the molded body 14 for the tube-shaped portion 4 alone and "RI" represents the inner diameter of the sintered body obtained by sintering the molded body 12 for the outer supporting body 2A alone.

If the "RO/RI" is too large, cracks tend to be generated in the tube-shaped portion 4 or outer supporting body 2A. On that viewpoint, the "RO/RI" may preferably be 1.20 or lower and more preferably be 1.15 or lower.

According to a preferred embodiment, the structure of brittle material and metal according to the present invention has a metal cylindrical portion formed continuously to the plate-shaped metal piece 3a. It is thus possible to easily perform the positioning of the metal piece 3a at a specific position during the heat treatment. It is thereby possible to prevent the positioning error (in particular, positioning error in the direction of X-axis) of the metal piece 3a when a pressure is applied onto the metal piece 3a.

Further, according to a preferred embodiment, the metal member 3 has a protruding portion 3c protruding inwardly and opposing the end face 4b of the tube-shaped portion 4. It is thus possible to perform the positioning of the metal piece 3a more assuredly. Further, the protrusion 3c is protruded so that the protrusion can be used for sealing an opening of the tube-shaped portion 4.

Figure 14:
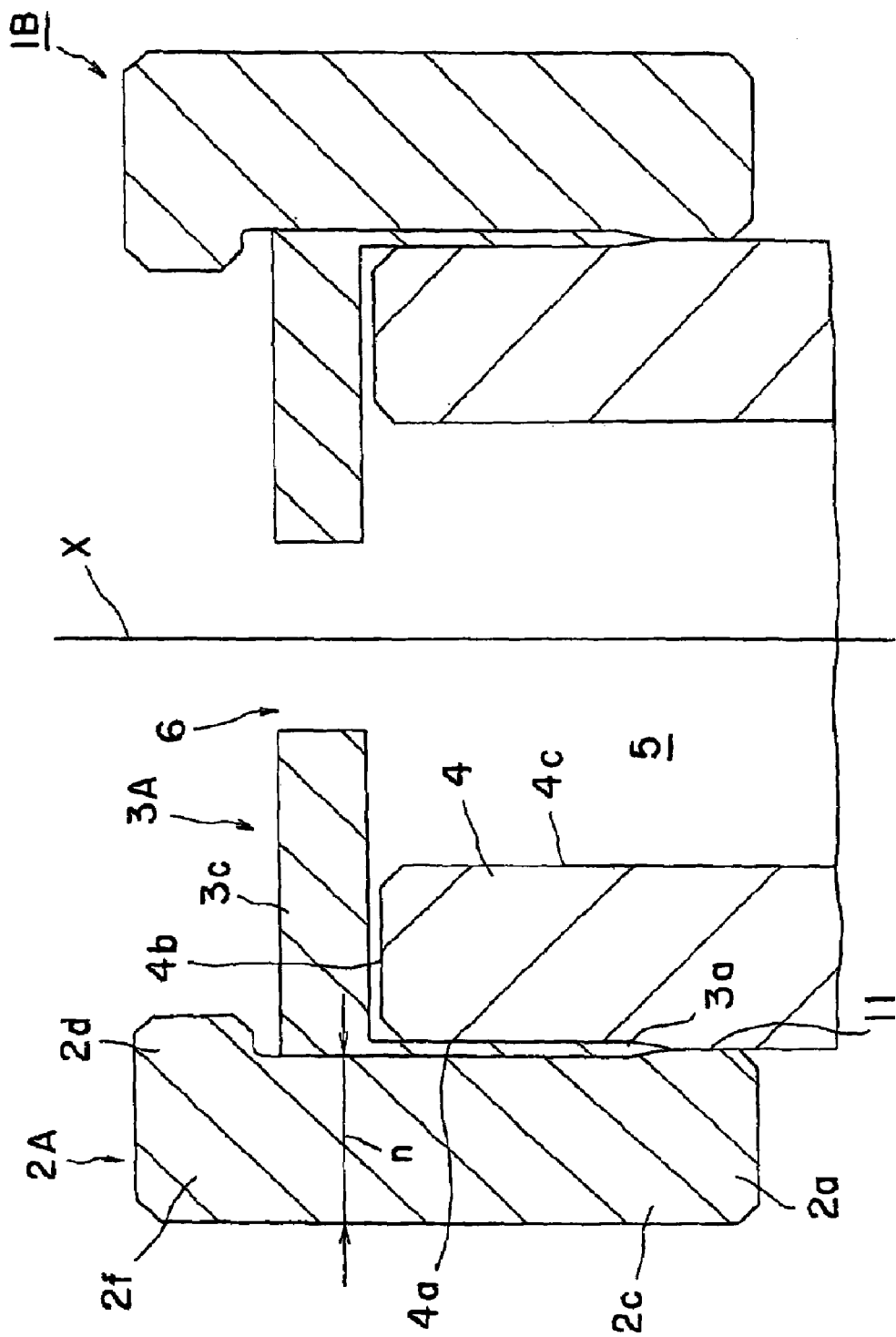
FIG. 14 is a cross sectional view showing a composite body 1B obtained by forming a through hole 6 in the composite body 1A of brittle material and metal.

For example, as shown in FIGS. 12 and 13, the whole surface of the opening of the tube-shaped portion 4 may be covered with the protruding portion 3c. In this case, another sealing member is unnecessary. Alternatively, as shown in FIG. 14, the protruding portion 3c is made ring-shaped, and a through hole 6 may be formed in the protruding portion 3c. In this case, the through hole 6 may be sealed with another metal member. The sealing may be, for example, metal welding.

Further, according to the first, second and third aspects, the outer supporting body 2A preferably has a ring-shaped portion 2d protruding inwardly. That is, the ring-shaped portion 2d acts as a kind of a stopper for preventing excessive deformation of the metal member 3, when a pressure is applied onto the metal member 3 during the heat treatment.

Figure 15:
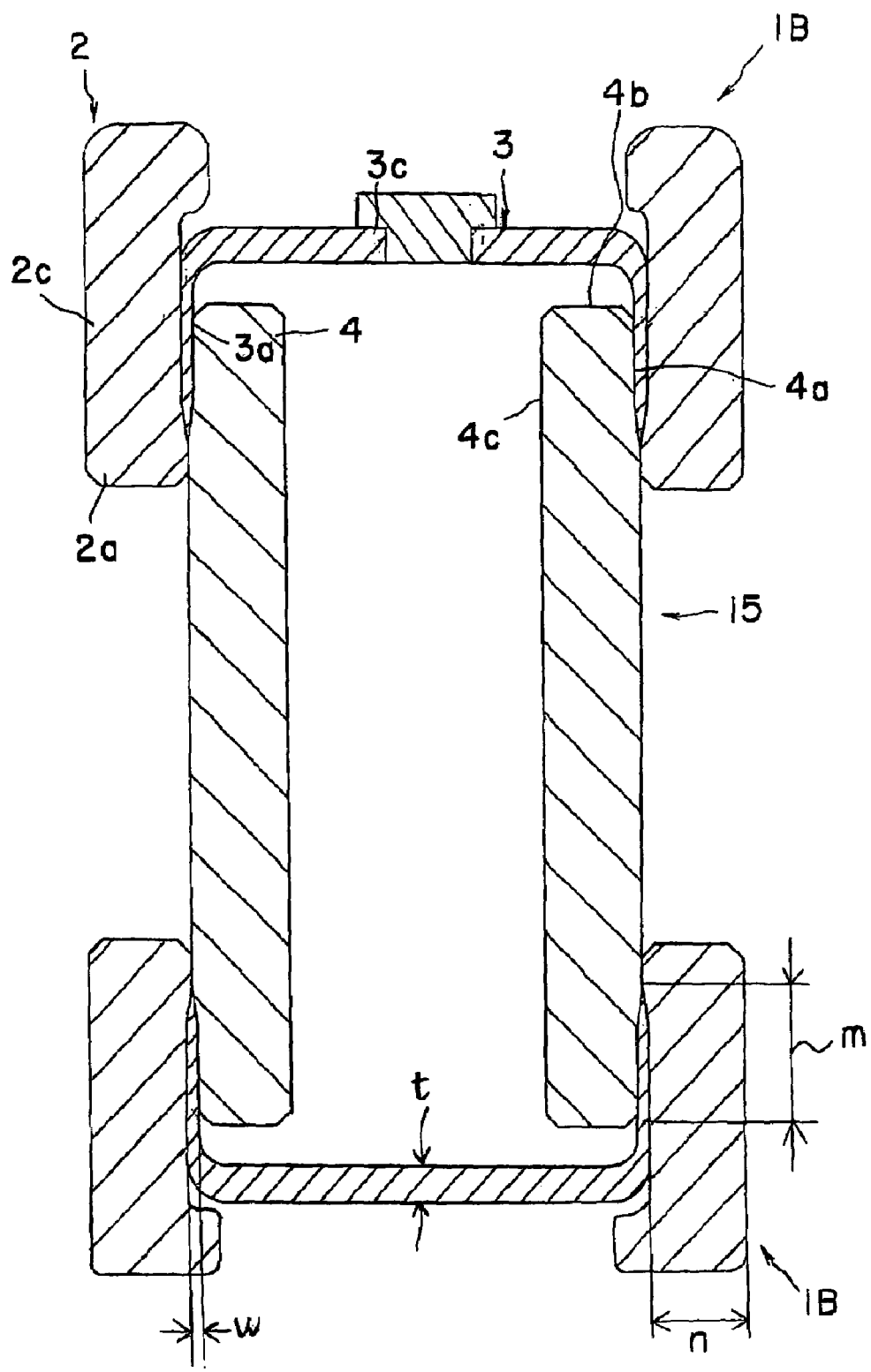

A structure 1B of FIG. 15 has an inner supporting body 4 composed of a tube-shaped body made of brittle material, an outer supporting body 2 outside of and shorter than the inner supporting body 4 and made of brittle material, and a plate-shaped metal piece 3a sandwiched between the inner supporting body 4 and outer supporting body 2. The inner supporting body 4 and plate-shaped metal piece 3a directly contact each other, the plate-shaped metal piece 3a and outer supporting body 2 directly contact each other and further the inner supporting body 4 and outer supporting body 2 also directly contact each other. One end of the plate-shaped metal piece 3a substantially having a shape of cylinder is covered with the protrusion 3c substantially having a shape of a disk. A pair of the structures 1B together form a member 15 covered and sealed.

Figure 16:
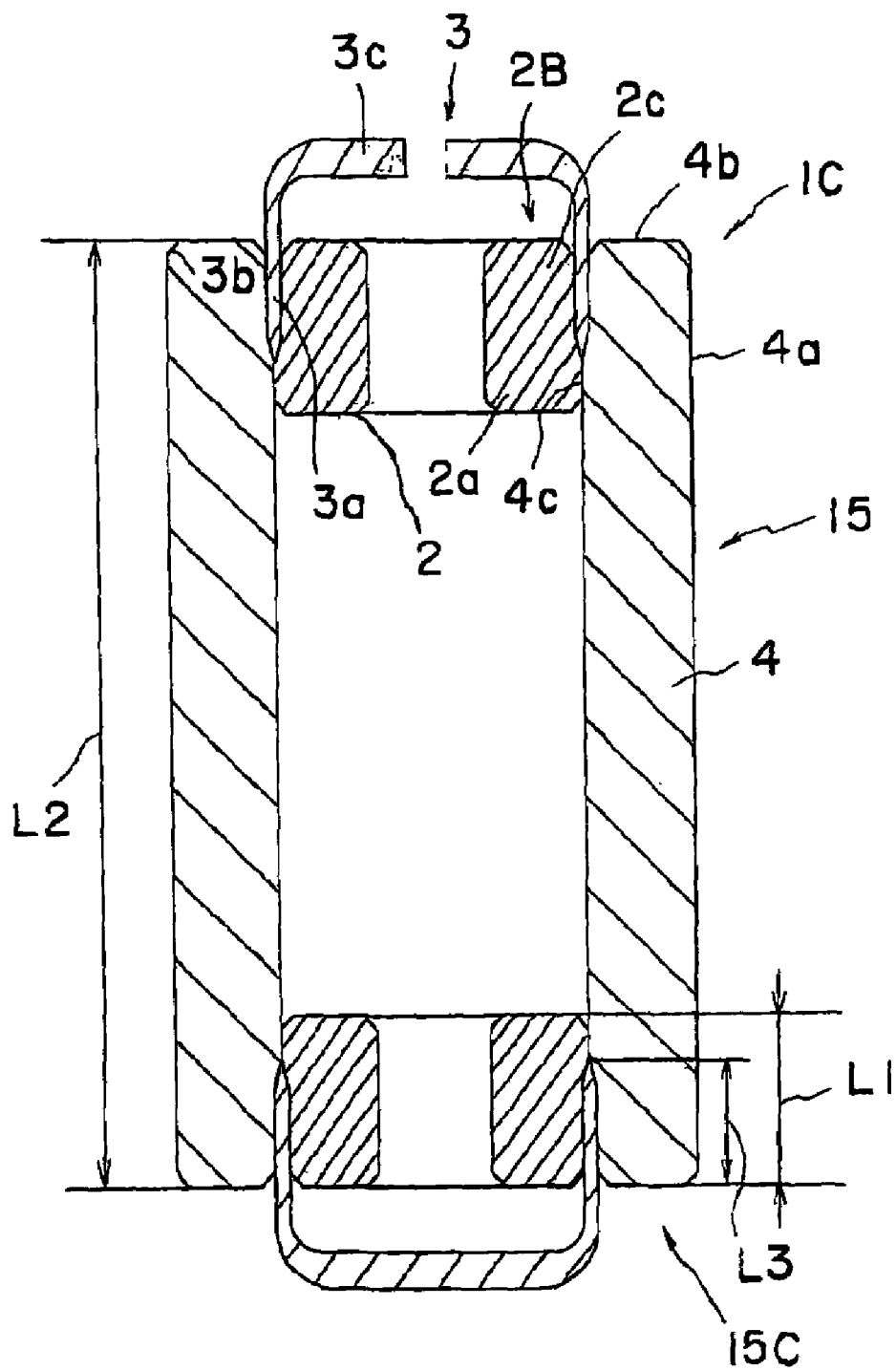

A structure 1C of FIG. 16 has an outer supporting body 4 composed of a tube-shaped body made of brittle material, an inner supporting body 2 inside of and shorter than the outer supporting body 4 and made of brittle material, and a plate-shaped metal piece 3a sandwiched between the outer supporting body 4 and inner supporting body 2. The inner supporting body 2 and plate-shaped metal piece 3a directly contact each other, the metal piece 3a and outer supporting portion 4 directly contact each other, and the inner supporting body 2 and outer supporting body 4 also directly contact each other. One end of the plate-shaped metal piece 3a substantially having a shape of cylinder is covered with a protrusion 3c substantially having a shape of a disk. A pair of structures 1C together form a member 15 sealed and covered.

Further, the thickness "n" of the outer supporting body (refer to FIG. 13) may preferably be 0.1 mm or larger and more preferably be 0.3 mm or larger, for strongly pressing the plate-shaped metal piece so as to improve the adhesion and air-tightness. The upper limit of "n" is not particularly defined.

The material and shape of the plate-shaped metal piece 3a is not particularly limited. The material of the metal piece may preferably be a metal having a high melting point or a conductive ceramic. Such metal having a high melting point includes one or more metal(s) selecting from the group consisting of molybdenum, tungsten, rhenium, hafnium, niobium and tantalum, or the alloy containing the metal(s). Further, metal parts other than the plate-shaped metal piece such as the cylindrical portion, ring-shaped portion and capillary portion may be made of the above metal(s) listed for the plate-shaped metal piece.

According to the preferred embodiment of the first, second and third aspects, the tube-shaped portion is made of sapphire, and the c-axis of sapphire forming the tube-shaped portion and the tube axis "X" of the tube-shaped body are intersected at an angle of 10° or lower. The c-axis of the tube-shaped portion made of sapphire and the tube axis (central axis) "X" of the tube-shaped portion are thus made aligned in substantially the same direction, so that the incidence of cracks in sapphire can be considerably reduced along and near the interface between the tube-shaped portion and the outer supporting body fixed at the end of the tube-shaped portion. On the viewpoint, the angle of the c-axis of sapphire forming the outer supporting body and the tube axis "X" may more preferably be 5° or lower.

When the inventive structure is applied as an air-tight sealing body, metal foils may be interposed to form a tube-shaped structure. In this case, a clearance of a shape of a triangle may be formed at the inner part of the foil in the radial direction. It is thus preferred that both ends of the inner part may be tapered if the foils are interposed with one another. So called seamless structure is most preferred. The plate-shaped metal piece may be pipe-shaped. It is also preferred that the metal piece is produced by rolling a single metal foil and the seam is joined with appropriate welding process as described above.

Further, the plate-shaped metal piece may substantially have a shape of a cap. Such cap may be produced by drawing or the like, although the production method is not particularly limited. However, if drawing process is applied for processing a rolled body for example, enbrittlement may progress during the heat treatment in a direction perpendicular to the direction of rolling. Attention is required on this point during the drawing process. Variations of the metal members may be appropriately adjusted depending on the design of the joined body.

The tube diameter of each of the pressing metal ring (tube) and both brittle material portions may be continuously varied in the direction of the tube axis when the joined body is tube shaped, for preventing the folds and floating of the clamped portion pressed. Further, for example, a highly heat resistant glass such as oxynitride glass may be alternatively used near the outlet of the joined portion where the metal is embedded within the brittle material.

EXAMPLES

Example 1

A structure shown in FIGS. 1(a) and (b) was produced. Specifically, the portion 23 is 20 mm in the longitudinal direction of the 40 mm plate-shaped metal piece 21 made of molybdenum having a thickness of 100 μm, a width of 20 mm and a length of 40 mm was sandwiched with two blocks (60×40×30 mm) of preliminary molded bodies of easily sinterable alumina powder having an alumina purity of 99.6 percent to prepare an assembly. Latex rubber liquid was applied onto the whole assembly and dried to cover the whole of the assembly. The assembly covered with rubber was pressed at a hydraulic pressure of 1000 kg/cm$^2$ to integrate the molded bodies and metal piece, which were then heated at 500° C. in air to remove the binder. The assembly was further heated at 1400° C. for 3 hours in a hydrogen atmosphere to sinter the alumina molded bodies to produce a structure of brittle material and metal having a protruded and non-clamped and non-pressed portion 22 having a length of about 20 mm.

Example 2

Figure 2:
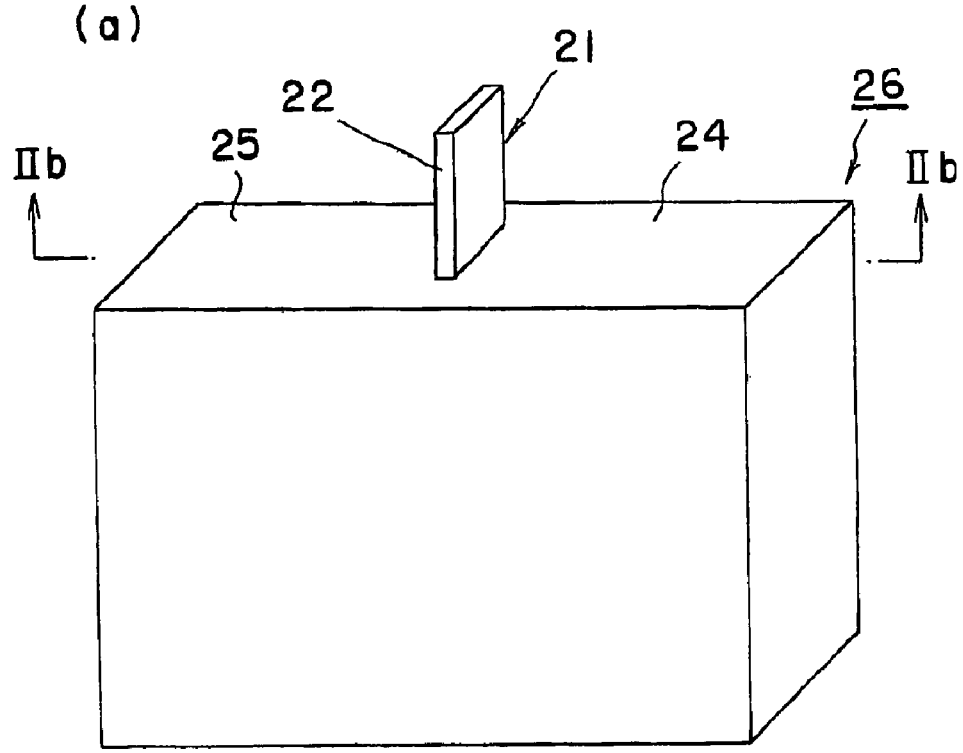
FIG. 2(a) is a perspective view showing a structure 26.
FIG. 2(b) is a cross sectional view showing the structure of FIG. 2(a).
Figure 2:
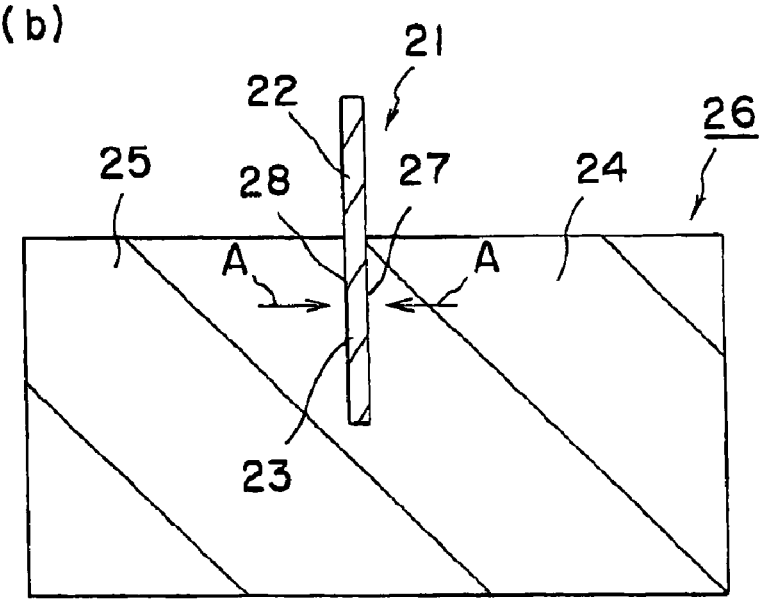

A structure shown in FIGS. 2(*a*) and (*b*) was produced. Specifically, a plate-shaped metal piece 21 made of nickel and having a thickness of 200 μm, a width of 20 mm and length of 40 mm was contained in a rubber container, so that a part having a length of 10 mm in the length of 40 mm was used as a non-pressed and non-clamped portion. Easily sinterable alumina powder having a alumina purity of 99.6 percent was filled in the rubber container. After the alumina powder was filled in the rubber container, the container was sealed and a hydraulic pressure of 2000 kg/cm$^2$ was applied. The resulting molded body was removed from the rubber container to obtain an alumina molded body in which the plate-shaped metal piece made of nickel was embedded. The molded body was then heated at 500° C. in air to remove the binder, and sintered at 1400° C. for 3 hours in a hydrogen atmosphere to sinter the alumina molded body and thus to produce a structure of brittle material and plate-shaped metal.

Example 3

A structure shown in FIG. 3 was produced. Specifically, a plate-shaped metal piece 21A made of pure copper having a thickness of 50 μm, a width of 40 mm and a length of 30 mm was wound around a cylindrical inner supporting body 25A made of zirconia ceramics (zirconia ceramics with 3 percent yttria added) and having a diameter of 20 mm and a height of 50 mm. The metal piece was prefixed to the inner supporting body with an adhesive. An outer supporting body 24A made of a cylindrical zirconia sintered body (ceramics with 3 mole percent of yttria added) was further prepared having an inner diameter of 20.05 mm, an outer diameter of 50 mm and a height of 50 mm. The outer supporting body 24A was heated to 1000° C. so that the body is subjected to thermal expansion. The inner supporting body 25A of zirconia encircled by the plate-shaped metal piece 21A of pure copper held at room temperature was inserted into the outer supporting body to produce an assembly, which was then slowly cooled to produce a structure of brittle material and metal having a non-pressed, protruded and non-clamped portion 22A having a length of 20 mm.

Example 4

A structure shown in FIG. 4 was produced. Specifically, a plate-shaped metal piece 21B made of pure copper having a thickness of 50 μm, a width of 15 mm and a length of 65 mm was wound around the upper part of 10 mm of a cylindrical inner supporting body 25A made of zirconia sintered body (zirconia ceramic with 3 percent yttria added) and having a diameter of 20 mm and a height of 30 mm. Both ends of the metal piece overlap each other by 2 mm, and the metal piece was prefixed to the inner supporting body with an adhesive. An outer supporting body 24A made of a cylindrical zirconia sintered body (ceramics with 3 mole percent of yttria added) is further prepared having an inner diameter of 20.05 mm, an outer diameter of 30 mm and a height of 30 mm. The outer supporting body 24A was heated to 1000° C. so that the body is subjected to thermal expansion. The inner supporting body 25A of zirconia wound by the plate-shaped metal piece 21B of pure copper held at room temperature was inserted into the outer supporting body to produce an assembly, which was then slowly cooled to produce a structure of brittle material and plate-shaped metal having a non-pressed, protruded and non-clamped portion 22B having a length of 5 mm.

Example 5

A structure shown in FIG. 5 was produced. Specifically, a plate-shaped metal piece made of molybdenum having a thickness of 100 μm, a width of 10 mm and a length of 27 mm was wound around the upper part of 8 mm of a cylindrical inner supporting body made of high purity alumina (alumina purity of 99.9 percent) and having a diameter of 8 mm and a height of 15 mm, so that both ends of the metal piece overlap each other by 2 mm. The metal piece was prefixed to the inner supporting body with an adhesive. It is further prepared a high purity alumina molded body molded at a pressure of 1000 kg/cm$^2$ so as to have a shape of a ring having an inner diameter of 8.3 mm, an outer diameter of 22.5 mm and a height of 19 mm. The molded body was heated at 500° C. in air to remove the binder.

The ring-shaped high purity alumina molded body is used as an outer supporting body. The alumina inner supporting body wound by the plate-shaped metal piece of molybdenum was inserted into the through hole of the outer supporting body to provide an assembly of the outer and inner supporting bodies. The assembly was further sintered at 1800° C. for 3 hours in a hydrogen atmosphere to sinter the alumina molded body to provide an outer supporting body. The sintering process of the outer supporting body results in the shrinkage to generate a force clamping the inner supporting body to integrate the inner and outer supporting bodies. At the same time, the plate-shaped metal piece 21B of molybdenum wound to the inner supporting body 25B is softened at a high temperature during the sintering process, so that the metal piece is subjected to plastic deformation in conformity with the surface profile of the alumina member due to the clamping force from the outer supporting member 24B. A sealed structure having excellent air-tightness can be thus realized. The interface where the alumina bodies directly contact each other is integrated with the sintering action of alumina to provide a seal structure having excellent strength and air-tightness.

At the part of molybdenum pressed during the cooling step, a thermal stress is generated in directions of the thickness and in-plane of the alumina body due to the difference of thermal expansion coefficients of alumina (about 8 ppm/° C.) and molybdenum (about 5 ppm/° C.). The stress generated in the alumina body is too small to cause the fractures, because the thickness of molybdenum piece (100 μm) is smaller than the thickness of each of the alumina bodies (5 or 8 mm). If such stress is generated, molybdenum can cause elastic or plastic deformation as the unique properties of a metal to relax the stress. At a part where molybdenum is not pressed, the same kinds of the alumina bodies having the same thermal expansion coefficients contact each other, so that a stress due to the difference of thermal expansion coefficients is not generated.

At the non-clamped portion, there is no interaction between the metal and alumina having the different thermal expansion coefficients, so that the stress can be completely avoided to provide an extremely reliable structure of brittle material and metal.

Example 6

A structure shown in FIG. 2 was produced. Specifically, a plate-shaped metal piece of molybdenum having a thickness of 100 μm, a width of 10 mm and a length of 50 mm was sandwiched by two blocks (60×40×30 mm) of pre-molded bodies of easily sinterable alumina (at a molding pressure of 300 kg/cm$^2$) having an alumina purity of 99.6 percent. A liquid of latex rubber was applied over the whole assembly and dried to cover the whole surface. The clamped length of the molybdenum piece was adjusted at various length described below. The molded body covered with rubber was pressed at a hydraulic pressure of 1000 kg/cm$^2$ to provide an integrated body, which was then heated at 500° C. in air to remove the binder. The integrated body was then sintered at 1400° C. for 3 hours in a hydrogen atmosphere to sinter the alumina molded bodies. Test pieces of alumina and molybdenum for evaluating the clamping force were produced, and each test piece has a pressed and clamped portion having a length of 0.5 mm, 1.0 mm, 3.0 mm, 5.0 mm or 10.0 mm.

The alumina portion of the test piece was fixed and the non-clamped and non-pressed portion of the molybdenum piece was pulled to measure the clamping force between the alumina body and molybdenum piece. It was also prepared a sample whose faces of the pressed and clamped portion of the molybdenum piece were subjected to sand blasting to increase the surface roughness. Data shown in table 1 with asterisk are the results of evaluation of the sample whose surface roughness of the pressed and clamped portion was increased by means of the sand blasting.

A value of 100 was assigned to the strength of the plate-shaped metal piece only of molybdenum (without the clamped portion) when it is pulled in the longitudinal direction. Each clamping force of the alumina-molybdenum was shown in table 1. It was proved that the clamping force comparable with the tensile strength of the molybdenum piece itself can be realized when the length of the clamped portion is 10 times or more of the thickness of the molybdenum piece. Further, it is possible to improve the clamping force in the test sample whose surface roughness is enlarged by a treatment such as sandblasting, even when the length of the clamped portion is not changed.

TABLE 1

| Length of pressed and Clamped portion (mm) | 0.5 | 1 | 1★ | 3 | 5 | 10 | None |
|---|---|---|---|---|---|---|---|
| Tensile strength (relative value) | 10 | 90 | 95 | 100 | 100 | 100 | 100 |
| Length of pressed and Clamped portion/Thickness of metal Piece | 5 | 10 | 10 | 30 | 50 | 100 | — |
| State of fracture of Clamped portion | Pulled out Portion | | Broken in molybdenum | | | | |

Further, in test samples same as described above, the length of the pressed and clamped portion was made constant at 10 mm, and the length of the non-clamped portion was variously changed to prepare test samples. It was proved that the bonding with the metal piece and another member by welding or soldering becomes difficult, when the length is not longer than about 5 times of the thickness of the metal piece, although depending on the use conditions.

TABLE 2

| Length of Non-clamped Portion (mm) | None | 0.1 | 0.3 | 0.5 | 1 | 2 | 5 |
|---|---|---|---|---|---|---|---|
| Length of Non-clamped Portion/Thickness of Metal piece | 0 | 1 | 3 | 5 | 10 | 20 | 50 |
| Availability of Welding | Impossible | Difficult | Difficult | Possible | Good | Good | |

Example 7

A structure shown in FIGS. 7 and 8(a) was produced. Specifically, a plate-shaped metal piece 21F of molybdenum having a thickness of 100 μm, a width of 17.5 mm and a length of 18 mm was wound to the upper part having a length of 17.5 mm of a tube-shaped inner supporting body 25F made of a high purity alumina sintered body (alumina purity of 99.9 percent) having a diameter of 5 mm, an inner diameter of 2 mm and a height of 20 mm. The ends of the molybdenum metal piece overlaps each other by about 2 mm, and the metal piece and supporting body were prefixed with an adhesive. It was also prepared high purity alumina molded bodies each molded at a pressure of 1000 kg/cm$^2$ so that the molded body has an inner diameter of 5.3 mm, a height of 6 mm and outer diameters of 5.9 mm, 6.5 mm, 8.4 mm, 10.4 mm and 13.4 mm, respectively. The molded bodies were heated at 500° C. in air to remove the binder.

The cylindrical high purity alumina molded body was used as an outer supporting body 24F. The inner supporting body 25F of alumina wound with the plate-shaped metal piece 21F of molybdenum was inserted into the through hole of the cylindrical outer supporting body, so that the outer and inner supporting bodies together form an assembly. The assembly was then sintered at 1800° C. for 3 hours in a hydrogen atmosphere to complete the sintering of the alumina molded body used as the outer supporting body. The sintering of the outer supporting body results in the shrinkage accompanied with the sintering to generate clamping force toward the inner supporting body to integrate the outer and inner supporting bodies.

Figure 8C:
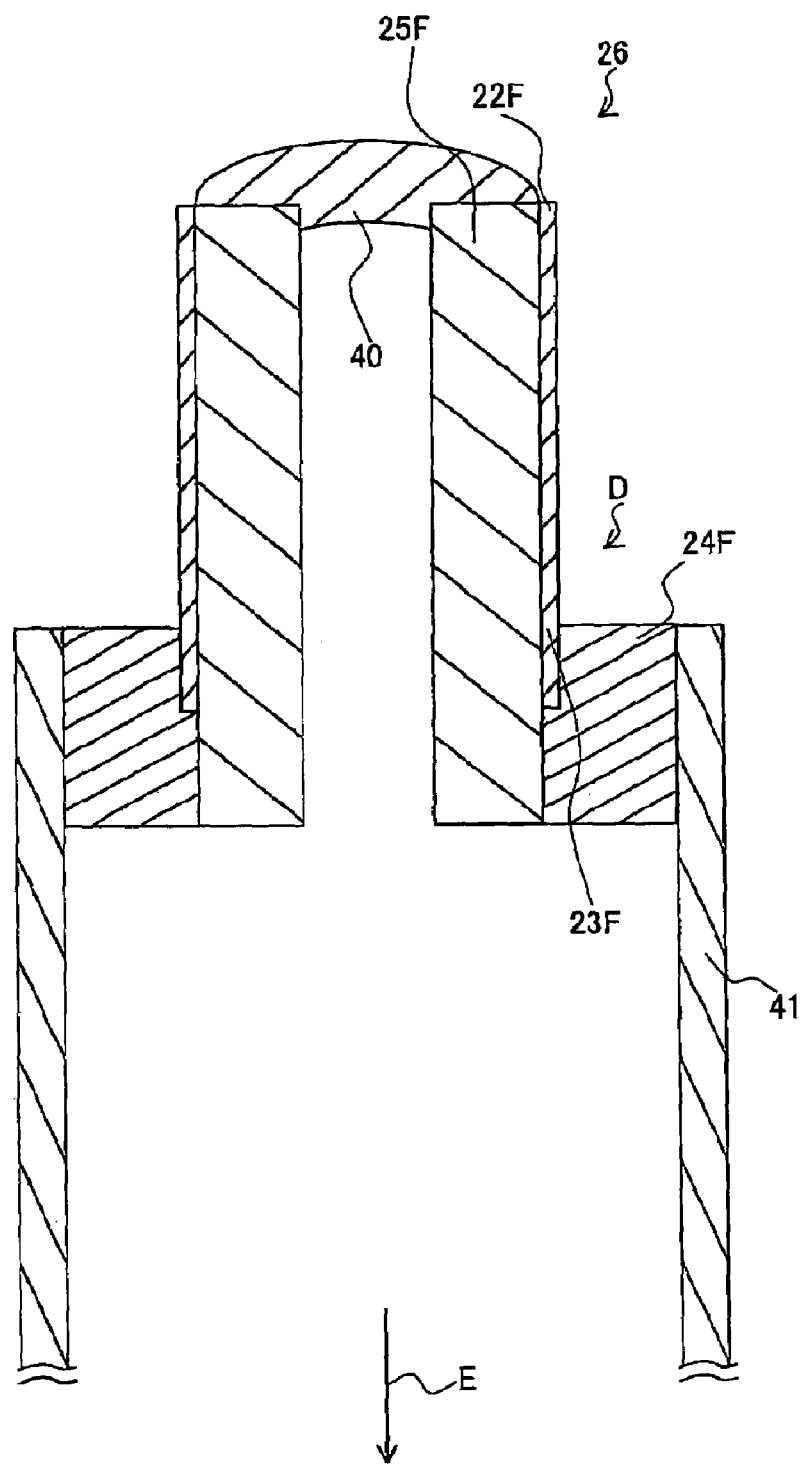

A helium leakage test was performed according to a process shown in FIG. 8(c). The outer surface of the outer supporting body integrated by the sintering was inserted into a vacuum tube 41 and the hole of the inner supporting body was clogged with an adhesive 40 or the like. Helium gas was sprayed to the bonding part of the outer and inner supporting bodies as shown by an arrow "D", while a tube 41 was drawn to vacuum. The air-tightness of the structure was evaluated with a helium leakage detector. That is, the leakage amount of helium gas leaked as shown by an arrow "E" was measured. As a result, relatively good air-tightness can be obtained even when the thickness of the outer supporting body was 0.25 mm. When the thickness of the outer supporting body was 0.5 mm or larger, the air-tightness was proved to be excellent in the level of measurement limit of the helium leakage detector.

TABLE 3

| | | | | | |
|---|---|---|---|---|---|
| Diameter of molded body for Outer supporting body (mm) | 5.9 | 6.5 | 8.4 | 10.4 | 13.4 |
| Diameter of outer supporting Body clamping metal piece After sintering (mm) | 5.7 | 6.2 | 7.7 | 9.3 | 1.17 |
| Thickness of outer Supporting portion (mm) | 0.25 | 0.5 | 1.25 | 2.05 | 3.25 |
| Thickness of outer supporting Portion/Thickness of metal piece | 2.5 | 5 | 12.5 | 20.5 | 32.5 |
| Thickness of inner Supporting body (mm) | | | 1.5 | | |
| Thickness of inner Supporting body/Thickness of metal piece | | | 15 | | |
| Air-tightness Helium leakage indication of Helium leakage Detector (atm · c c · sec$^{-1}$) | $3 \times 10^{-5}$ | $2 \times 10^{-9}$ | $1 \times 10^{-9}$ | $1 \times 10^{-9}$ | $1 \times 10^{-9}$ |

Example 8

A structure shown in FIG. 6 was produced. Specifically, plate-shaped metal pieces 21C, 21D and 21E made of nickel were prepared, each having a thickness of 200 μm, a width of 20 mm and a length of 50 mm, and the parts of a length of 10 mm of the whole length of 50 mm of the plate-shaped metal pieces 21D, 21E were used as non-pressed and non-clamped portion 22C, 22D and 22E, respectively. Each of the non-clamped portions was inserted into a block of quartz glass heated and softened at 1500° C., which was then cooled to produce a structure of brittle material and plate-shaped metal piece. The tip ends of the pressed and clamped portions 23C, 23D and 23E of the nickel metal piece had shapes of a rectangular as cut, knife-edge, chamfer and radius, respectively.

When the tip end of the metal piece had a shape of a knife-edge, chamfer or radius, the adhesion at the contact point of quartz glass and the tip end of the metal piece was proved to be excellent. When the tip end is rectangular, microcracks were observed at the corners in some samples. It was thus proved that the stress can be reduced by applying a knife-edge, chamfer or radius as the shape of the tip end.

Example 9

A structure shown in FIG. 8(b) was produced. Specifically, into a molybdenum tube having a thickness of 100 μm, an inner diameter of 2.05 mm and length of 10 mm, a tube-shaped inner supporting body 25F made of single crystal alumina (sapphire) having a diameter of 5mm, an inner diameter of 2 mm and a length of 20 mm was inserted. A high purity alumina molded body molded at a pressure of 1000 kg/cm² was further produced, so that the molded body had a shape of a cylinder having an inner diameter of 5.3 mm, an outer diameter of 13.4 mm and a height of 6 mm, whose binder was removed at 500° C. in air. The cylindrical and high purity alumina molded body was used as the outer supporting body 24F. Into the through hole of the cylindrical outer supporting body, the inner supporting body 25F of sapphire equipped with the molybdenum tube 21F was inserted to produce an assembly of the outer and inner supporting bodies. The tip ends of the sapphire tube and alumina molded body were set to form a common flat plate, and a part of the molybdenum tube was protruded from the tip end of the sapphire tube by 5 mm or 7.5 mm to provide a non-pressed and non-clamped portion.

The thus obtained assembly was further sintered at 1800° C. for 3 hours in a hydrogen atmosphere to complete the sintering of the outer supporting body composed of the alumina molded body. The sintering of the outer supporting body resulted in the shrinkage due to the sintering, so as to generate clamping force toward the inner supporting body to integrate the outer and inner supporting bodies.

When the non-pressed and non-clamped portion had a length of 5 mm, the plate-shape metal piece composed of the molybdenum tube is provided over the whole of the pressed and clamped portion. When the non-pressed and non-clamped portion had a length of 7.5 mm, the length of the pressed and clamped portion was about 2 mm, so as to produce a part where the outer and inner supporting bodies directly contact each other. In this part, the sintering process is proceeded along the interface to strongly integrate them and to improve the air-tightness. FIG. 8(b) schematically shows an example where the non-pressed and non-clamped portion had a length of 7.5 mm.

Further, the non-pressed and non-clamped portion of the molybdenum tube is used to connect a metal member having another shape by means of welding, soldering, mechanical fitting or the like.

For example, as shown in FIG. 10, a molybdenum flange 36 having a small capillary 38 having an inner diameter of 0.5 mm was joined by laser welding.

Example 10

A structure of FIG. 11 was produced. Specifically, it was prepared a cap 22G of nickel produced by deep drawing and having a thickness of 100 μm, an inner diameter of 3.05 mm and a height of 5 mm (one end of the cap is used as a cover portion 41). A tube-shaped supporting body 25F composed of a high purity alumina sintered body was prepared having a diameter of 3 mm, an inner diameter of 2 mm and a length of 10 mm. A molded body of easily sinterable alumina powder of a purity of 99.6 percent at a pressure of 100 kg/cm$^2$ was produced so that the molded body has a shaped of a ring having an inner diameter of 3.3 mm, an outer diameter of 7 mm and a height of 12 mm. The molded body was heated at 500° C. in air to remove the binder.

The inner supporting body 25F of high purity alumina equipped with the nickel cap 21G was inserted into the through hole of the outer supporting body 24F composed of the molded body of easily sinterable alumina powder and having a shape of a ring to produce an assembly of inner and outer supporting bodies. The high purity alumina tube and the tip end of the ring-shaped outer alumina molded body are adjusted to form a common flat plane, and a protrusion is formed in the nickel cap to cover the tip end of the sapphire tube to provide a non-pressed and non-clamped portion.

The thus obtained assembly was sintered at 1350° C. for 3 hours in a hydrogen atmosphere to complete the sintering of the alumina molded body for the outer supporting body. The sintering of the outer supporting body results in the shrinkage due to the sintering process to generate clamping force toward the inner supporting body, so that the outer and inner supporting bodies are integrated.

The structure of brittle material and metal has a cap-shaped non-pressed and non-clamped portion, which can be connected with another metal part by means of welding, soldering or mechanical fitting.

Example 11

A structure shown in FIG. 9 was produced. Specifically, a nickel tube 21F was prepared having a thickness of 100 µm, an inner diameter of 3.05 mm and a length of 10 mm. A tube-shaped inner supporting body 25F composed of a high purity alumina calcined body (calcined at 1250° C.) was also produced having a diameter of 3 mm, an inner diameter of 2 mm and a length of 10 mm. Further, a molded body of easily sinterable alumina was produced having a purity of 99.6 percent molded at a pressure of 1000 kg/cm$^2$ and having a shape of a ring having an inner diameter of 3.3 mm, an outer diameter of 10 mm and a height of 11 mm. The molded body was heated at 500° C. to remove the binder.

The tip end of the high purity alumina calcined body and the end on the inner side of the ring-shaped molded body of easily sinterable alumina were subjected to C-or R-plane formation process as a design for avoiding the concentration of stress onto the metal after the integration by sintering.

Into the through hole of the alumina molded body as the outer supporting 24F, the inner supporting body 25F made of high purity alumina equipped with the nickel tube 21F was inserted to provide an assembly of the inner and outer supporting bodies. The end faces of the high purity alumina tube and ring-shaped alumina molded body were adjusted to provide a common flat plane, and a protrusion of 5 mm was formed in the nickel tube from the alumina tube to provide a non-pressed and non-clamped portion 22F.

The assembly was sintered at 1350° C. for 3 hours in a hydrogen atmosphere to complete the sintering of the alumina molded body for the outer supporting body. The sintering of the outer supporting body resulted in the shrinkage due to the sintering to generate clamping force toward the inner supporting body, so that outer and inner supporting bodies were integrated to produce a structure of brittle material and metal.

Example 12

A composite structure of alumina-metal shown in FIG. 15 was produced according to the procedure described referring to FIGS. 12 and 13. Specifically, to high purity alumina powder having a purity of 99.9 percent or more, 750 ppm of magnesium oxide, 2 weight percent of polyvinyl alcohol, 0.5 weight percent of polyethylene glycol and 50 weight parts of water were added and ground in a ball mill for 1 hour for complete the mixing. The mixture was dried and granulated around 200° C. with a spray drier to produce granulated powder having a mean grain diameter of 70 µm and a static bulk density of 0.7 g/cm$^2$.

The granulated powder was press molded at a pressure of 1000 kg/cm$^2$ to obtain a molded body 12 for the outer supporting body shown in FIG. 12 and a molded body 14 for the tube-shaped body. For this, the diameters of the molded bodies were adjusted so that the ratio (RO/RI) of the outer diameter "RO" of the sintered body of the molded body 14 for tube-shaped body with respect to the inner diameter "RI" of the sintered body of the molded body 12 for outer supporting body when each molded body would have been sintered alone was changed as shown in table 4.

The molded bodies 12, 14 and the molybdenum metal member 13 were assembled as shown in FIG. 12 and sintered at 1400° C. in a hydrogen atmosphere. One end portion of the molded body 14 was composed of a molybdenum metal member having a through hole as shown in FIG. 14. The thus obtained tube-shaped body 4 had a diameter φ of 2 mm, an inner diameter of 1 mm and a length of 20 mm. Further, the thickness "W" of the plate-shaped metal piece 3a was 150 µm, the length "m" of the pressed and clamped portion was 3 mm, the thickness "n" of the outer supporting body was 1.5 mm and the thickness "t" of the metal of the cover of the non-clamped portion was 0.5 mm.

For evaluating the air-tightness of the structure at high temperature, mercury was supplied into each assembly 10A (FIG. 15) through the through hole of the cover of one molybdenum metal member in an amount of 150 atm at 1200° C. and the through hole was clogged with a plug made of molybdenum and by welding to complete the sealing. Further, the test piece was contained in an outer tube of quartz kept at vacuum. The test piece was loaded with thermal cycle test of 1000 cycles, in which each cycle is consisting of a holding step at 1200° C. for 5 minutes and a holding step at room temperature for 25 minutes.

After the thermal cycle test was loaded, the luminescence from the inside of the quartz outer tube was observed to evaluate the air-tightness using Tesla Coil. Five pieces of test samples were produced. It was evaluated as in-specification in the case of observing luminescence and as out-of-specification in the case of no luminescence. The rate of in-specification was shown in table 4.

TABLE 4

| | RO/RI | | | | | | |
|---|---|---|---|---|---|---|---|
| | 1.01 | 1.02 | 1.04 | 1.07 | 1.10 | 1.15 | 1.20 |
| Test Results (%) | 20 | 60 | 100 | 100 | 100 | 100 | 100 |

As described above, the present invention provides a structure having a sealed part with excellent reliability. It is further proved that the so called ratio (RO/RI) of fitting by co-sintering may most preferably be 1.04 or larger.

Example 13

A high purity alumina sintered body having an outer diameter of 1 mm, an inner diameter of 0.5 mm and a length of 5 mm was used as an inner supporting body and combined with a metal member 3 of molybdenum to prepare a high purity alumina molded body having an outer diameter of 2.5 mm, an inner diameter of 1.25 mm and a length of 25 mm. The alumina molded body was sintered at 1400° C. in hydrogen atmosphere as shown in FIG. 16. The ratio of fitting by sintering (RO/RI) was adjusted to be 1.20.

The applications of the structures of brittle material and metal according to the first, second and third aspects of the present invention are not particularly limited. The applications include ceramic articles requiring air-tightness in high temperature environment such as a high temperature reaction container, a thermal exchanger, and a member for use in producing semiconductors.

What is claimed is:

1. A structure of brittle material and metal, said structure comprising:
   an outer supporting body comprising a tube-shaped portion of a brittle material;
   a pipe-shaped inner supporting body provided inside of said outer supporting body and made of a brittle material; and
   a pipe-shaped metal piece comprising a clamped portion pressed and clamped with said brittle materials of said outer and pipe-shaped inner supporting bodies and a non-clamped portion not clamped with said brittle materials of said outer and piped-shaped inner supporting bodies,
   wherein said outer supporting body and said pipe-shaped metal piece directly contact each other, said pipe-shaped metal piece and said pipe-shaped inner supporting body directly contact each other, and said outer supporting body and said pipe-shaped inner supporting body directly contact each other throughout an entire circumference of the inner supporting body along a length of the inner supporting body.

2. The structure of brittle material and metal of claim 1, wherein said clamped portion is embedded in said brittle materials of said outer and pipe-shaped inner supporting bodies.

3. The structure of brittle material and metal of claim 2, wherein the tip end of said clamped portion comprises a shape of a knife edge, C-plane or R-plane.

4. The structure of brittle material and metal of claim 1, wherein a minimum pressure bonded length of said clamped portion of said pipe-shaped metal piece measured longitudinally is 10t or longer, a minimum length of said non-clamped portion of said pipe-shaped metal piece measured longitudinally is 5t or longer and a minimum length of said brittle materials of said outer and pipe-shaped inner supporting bodies measured in a direction of a minimum thickness of said pipe-shaped metal piece is 5t or larger, provided that the minimum thickness of said pipe-shaped metal piece is "t".

5. The structure of brittle material and metal of claim 1, wherein said brittle materials of said outer and pipe-shaped inner supporting bodies is substantially integrated.

6. The structure of brittle material and metal of claim 1, wherein said clamped portion substantially has a shape of a cylinder.

7. The structure of brittle material and metal of claim 6, wherein said inner supporting body substantially has a shape of a cylinder or a column.

8. The structure of brittle material and metal of claim 6, wherein said outer supporting body substantially has a shape of a cylinder.

9. The structure of brittle material and metal of claim 8, wherein the tube axes of said clamped portion, said inner supporting body and said outer supporting body are substantially the same.

10. The structure of brittle material and metal of claim 1, wherein said inner supporting body substantially has a shape of a cylinder or a column.

11. The structure of brittle material and metal of claim 10, wherein said outer supporting body substantially has a shape of a cylinder.

12. The structure of brittle material and metal of claim 1, wherein said non-clamped portion is used for connecting said non-clamped portion and another metal member.

13. The structure of brittle material and metal of claim 1, wherein said pipe-shaped metal piece has a shape of a seamless cylinder.

14. The structure of brittle material and metal of claim 1, wherein said non-clamped portion of said pipe-shaped metal piece comprises a cover structure.

15. The structure of brittle material and metal of claim 1, wherein said brittle materials of said outer and piped-shaped inner supporting bodies is selected from the group consisting of a glass, a ceramics and a cermet.

16. The structure of brittle material and metal of claim 1, wherein the difference of the thermal expansion coefficients of said outer and inner supporting bodies is 2 ppm/K or lower.

17. The structure of brittle material and metal of claim 1, wherein said outer supporting body has an inner surface curved or inclined with respect to the central axis of said inner supporting body.

18. A structure of brittle material and metal, comprising an outer supporting body comprising a tube-shaped portion of a brittle material, a pipe-shaped inner supporting body provided inside of said outer supporting body, made of a brittle material and shorter than said outer supporting body, and a pipe-shaped metal piece provided between said outer supporting body and said pipe-shaped inner supporting body,
   wherein said outer supporting body and said pipe-shaped metal piece directly contact each other, said pipe-shaped metal piece and said pipe-shaped inner supporting body directly contact each other and said outer supporting body and said pipe-shaped inner supporting body directly contact each other throughout an entire circumference of the inner supporting body along a length of the inner supporting body.

19. The structure of brittle material and metal of claim 18, wherein said brittle materials of said outer and pipe-shaped inner supporting bodies is selected from the group consisting of a glass, a ceramics and a cermet.

20. The structure of brittle material and metal of claim 18, wherein the difference of thermal expansion coefficients of said outer and inner supporting bodies is 2 ppm/K or lower.

21. The structure of brittle material and metal of claim 18, wherein said outer supporting body has an inner surface curved or inclined with respect to the central axis of said inner supporting body.

22. The structure of brittle material and metal of claim 18, wherein said outer supporting body comprises a ring-shaped portion protruding inside so as to prevent the deformation of said pipe-shaped metal piece by said ring-shaped portion.

23. The structure of brittle material and metal of claim 18, wherein said outer supporting body has a shrinkage percentage of sintering higher than that of said inner supporting body so that said pipe-shaped metal piece is pressed due to the difference of shrinkage during the sintering.

24. The structure of brittle material and metal of claim 23, wherein said brittle material forming said inner supporting body has a shrinkage percentage of sintering of substantially zero so that said pipe-shaped metal piece is pressed due to the shrinkage during sintering of said outer supporting body.

25. The structure of brittle material and metal of claim 18, wherein said pipe-shaped metal piece has a thickness of 20 to 1000 μm.

26. The structure of brittle material and metal of claim 18, wherein said outer supporting body has a thickness of 0.1 mm or larger.

27. A structure of brittle material and metal, comprising an inner supporting body comprising a tube-shaped portion made of a brittle material, an outer supporting body provided outside of said inner supporting body, made of a brittle material and shorter than said inner supporting body, and a plate-shaped metal piece provided between said inner and outer supporting bodies,
wherein said inner supporting body and said plate-shaped metal piece directly contact each other, said plate-shaped metal piece and said outer supporting body directly contact each other and said inner supporting body and said outer supporting body directly contact each other.

28. The structure of brittle material and metal of claim 27, wherein said brittle materials of said outer and inner supporting bodies is selected from the group consisting of a glass, a ceramics and a cermet.

29. The structure of brittle material and metal of claim 27, wherein the difference of thermal expansion coefficients of said outer and inner supporting bodies is 2 ppm/K or lower.

30. The structure of brittle material and metal of claim 27, wherein said outer supporting body has an inner surface curved or inclined with respect to the central axis of said inner supporting body.

31. The structure of brittle material and metal of claim 27, wherein said outer supporting body comprises a ring-shaped portion protruding inside so as to prevent the deformation of said plate-shaped metal piece by said ring-shaped portion.

32. The structure of brittle material and metal of claim 27, wherein said outer supporting body has a shrinkage percentage larger than that of said inner supporting body to press said plate-shaped metal piece due to the difference of shrinkage percentages.

33. The structure of brittle material and metal of claim 32, wherein said brittle material forming said inner supporting body has a shrinkage of sintering of substantially zero so that said plate-shaped metal piece is pressed due to the shrinkage during sintering of said outer supporting body.

34. The structure of brittle material and metal of claim 27, wherein said plate-shaped metal piece has a thickness of 20 to 1000 μm.

35. The structure of brittle material and metal of claim 27, wherein said outer supporting body has a thickness of 0.1 mm or larger.

* * * * *